(12) United States Patent
Marwinski et al.

(10) Patent No.: US 7,581,066 B2
(45) Date of Patent: *Aug. 25, 2009

(54) CACHE ISOLATION MODEL

(75) Inventors: Dirk Marwinski, Heidelberg (DE); Petio G. Petev, Sofia (BG)

(73) Assignee: SAP AG, Walldorf (DE)

( * ) Notice: Subject to any disclaimer, the term of this patent is extended or adjusted under 35 U.S.C. 154(b) by 636 days.

This patent is subject to a terminal disclaimer.

(21) Appl. No.: 11/119,084

(22) Filed: Apr. 29, 2005

(65) Prior Publication Data

US 2006/0248131 A1 Nov. 2, 2006

(51) Int. Cl.
*G06F 12/08* (2006.01)
*G06F 17/30* (2006.01)

(52) U.S. Cl. .................... 711/129; 707/8; 711/130
(58) Field of Classification Search ........... None
See application file for complete search history.

(56) References Cited

U.S. PATENT DOCUMENTS

| | | | |
|---|---|---|---|
| 5,566,315 A | 10/1996 | Milillo et al. | |
| 5,692,193 A | 11/1997 | Jagannathan et al. | |
| 5,710,909 A | 1/1998 | Brown et al. | |
| 5,809,527 A * | 9/1998 | Cooper et al. | 711/133 |
| 5,926,834 A | 7/1999 | Carlson et al. | |
| 5,944,781 A | 8/1999 | Murray | |
| 6,038,571 A | 3/2000 | Numajiri et al. | |
| 6,075,938 A | 6/2000 | Bugnion et al. | |
| 6,092,171 A | 7/2000 | Relph | |
| 6,199,179 B1 | 3/2001 | Kauffman et al. | |
| 6,216,212 B1 | 4/2001 | Challenger et al. | |
| 6,256,712 B1 | 7/2001 | Challenger et al. | |
| 6,272,598 B1 | 8/2001 | Arlitt et al. | |
| 6,295,582 B1 | 9/2001 | Spencer | |
| 6,356,529 B1 | 3/2002 | Zarom | |
| 6,356,946 B1 | 3/2002 | Clegg et al. | |
| 6,412,045 B1 | 6/2002 | DeKoning et al. | |
| 6,425,057 B1 | 7/2002 | Cherkasova et al. | |
| 6,438,654 B1 | 8/2002 | Elko et al. | |
| 6,446,088 B1 * | 9/2002 | Vaduvur et al. | 707/201 |
| 6,519,594 B1 | 2/2003 | Li | |
| 6,587,937 B1 | 7/2003 | Jensen et al. | |
| 6,591,347 B2 | 7/2003 | Tischler et al. | |
| 6,651,080 B1 | 11/2003 | Liang et al. | |
| 6,732,237 B1 | 5/2004 | Jacobs et al. | |

(Continued)

FOREIGN PATENT DOCUMENTS

EP    1 380 941    1/2004

(Continued)

OTHER PUBLICATIONS

""SAP Web Application Server Security Guide"", *Version 1.00*, (Apr. 29, 2004), pp. 79-81, 89.

(Continued)

*Primary Examiner*—Gary J Portka
(74) *Attorney, Agent, or Firm*—Schwegman, Lundberg & Woessner, P.A.

(57) ABSTRACT

One embodiment of the invention employs techniques for providing isolation for exclusivity of operation. Isolation may exist between different application and/or different threads or virtual machines of the same application. In one embodiment, using a lock helps to ensure that operations are executed exclusive of each other.

18 Claims, 28 Drawing Sheets

U.S. PATENT DOCUMENTS

| | | | |
|---|---|---|---|
| 6,738,977 B1 | 5/2004 | Berry et al. | |
| 6,754,662 B1 | 6/2004 | Li | |
| 6,757,708 B1* | 6/2004 | Craig et al. | 709/203 |
| 6,766,419 B1 | 7/2004 | Zahir et al. | |
| 6,829,679 B2 | 12/2004 | DeSota et al. | |
| 6,944,711 B2 | 9/2005 | Mogi et al. | |
| 6,976,090 B2 | 12/2005 | Ben-Shaul et al. | |
| 6,990,534 B2 | 1/2006 | Mikhailov et al. | |
| 6,996,679 B2 | 2/2006 | Cargnoni et al. | |
| 7,024,512 B1 | 4/2006 | Franaszek et al. | |
| 7,051,161 B2 | 5/2006 | Dixit et al. | |
| 7,069,271 B1 | 6/2006 | Fadel et al. | |
| 7,096,319 B2* | 8/2006 | Mogi et al. | 711/129 |
| 7,096,418 B1* | 8/2006 | Singhal et al. | 715/205 |
| 7,191,170 B2 | 3/2007 | Ganguly et al. | |
| 7,296,267 B2 | 11/2007 | Cota-Robles et al. | |
| 7,305,495 B2 | 12/2007 | Carter | |
| 2002/0046325 A1 | 4/2002 | Cai et al. | |
| 2002/0052914 A1 | 5/2002 | Zalewski et al. | |
| 2002/0073283 A1 | 6/2002 | Lewis et al. | |
| 2002/0093487 A1 | 7/2002 | Rosenberg | |
| 2002/0099691 A1 | 7/2002 | Lore et al. | |
| 2002/0099753 A1 | 7/2002 | Hardin et al. | |
| 2002/0147888 A1 | 10/2002 | Trevathan | |
| 2002/0156863 A1 | 10/2002 | Peng | |
| 2002/0169926 A1 | 11/2002 | Pinckney et al. | |
| 2002/0198953 A1 | 12/2002 | O'Rourke et al. | |
| 2003/0023827 A1 | 1/2003 | Palanca et al. | |
| 2003/0037148 A1 | 2/2003 | Pedersen | |
| 2003/0084248 A1 | 5/2003 | Gaither et al. | |
| 2003/0084251 A1 | 5/2003 | Gaither et al. | |
| 2003/0093487 A1 | 5/2003 | Czajkowski et al. | |
| 2003/0097360 A1 | 5/2003 | McGuire et al. | |
| 2003/0131010 A1 | 7/2003 | Redpath | |
| 2003/0229760 A1 | 12/2003 | Doyle et al. | |
| 2003/0236857 A1 | 12/2003 | Takase et al. | |
| 2004/0024971 A1 | 2/2004 | Bogin et al. | |
| 2004/0054860 A1 | 3/2004 | Dixit et al. | |
| 2004/0088412 A1 | 5/2004 | John et al. | |
| 2004/0117441 A1 | 6/2004 | Liu et al. | |
| 2004/0168029 A1 | 8/2004 | Civlin | |
| 2004/0168031 A1 | 8/2004 | Haskins | |
| 2004/0205299 A1 | 10/2004 | Bearden | |
| 2005/0021917 A1 | 1/2005 | Mathur et al. | |
| 2005/0027943 A1 | 2/2005 | Steere et al. | |
| 2005/0071459 A1 | 3/2005 | Costa-Requena et al. | |
| 2005/0086656 A1 | 4/2005 | Whitlock et al. | |
| 2005/0086662 A1 | 4/2005 | Monnie et al. | |
| 2005/0091388 A1 | 4/2005 | Kamboh et al. | |
| 2005/0125503 A1 | 6/2005 | Iyengar et al. | |
| 2005/0131962 A1 | 6/2005 | Deshpande | |
| 2005/0138193 A1 | 6/2005 | Encarnacion et al. | |
| 2005/0154837 A1 | 7/2005 | Keohane et al. | |
| 2005/0180429 A1 | 8/2005 | Ghahremani et al. | |
| 2005/0198199 A1 | 9/2005 | Dowling | |
| 2005/0262181 A1 | 11/2005 | Schmidt et al. | |
| 2005/0262493 A1 | 11/2005 | Schmidt et al. | |
| 2005/0262512 A1 | 11/2005 | Schmidt et al. | |
| 2006/0064545 A1 | 3/2006 | Wintergerst | |
| 2006/0064549 A1 | 3/2006 | Wintergerst | |
| 2006/0070051 A1 | 3/2006 | Kuck et al. | |
| 2006/0092165 A1 | 5/2006 | Abdalla et al. | |
| 2006/0136667 A1 | 6/2006 | Shultz et al. | |
| 2006/0143256 A1 | 6/2006 | Galchev et al. | |
| 2006/0143328 A1 | 6/2006 | Fleischer et al. | |
| 2006/0143389 A1 | 6/2006 | Kilian et al. | |
| 2006/0143392 A1 | 6/2006 | Petev et al. | |
| 2006/0143427 A1 | 6/2006 | Marwinski et al. | |
| 2006/0143618 A1 | 6/2006 | Fleischer et al. | |
| 2006/0143619 A1 | 6/2006 | Galchev et al. | |
| 2006/0155867 A1 | 7/2006 | Kilian et al. | |
| 2006/0248284 A1 | 11/2006 | Petev | |

FOREIGN PATENT DOCUMENTS

WO     WO 00/23898     4/2000

OTHER PUBLICATIONS

"All Classes", http://www.jdocs.com/osche/2.0.2/api/com/opensymphony/oscache/base/allclasses-frame.html, (Jan. 2004), 1.

"All Classes , Packages", http://www.jdocs.com/osche/2.0.2/api/overview-frame.html, OSCache 2.0.2, (Jan. 2004), 1.

"Caching with IBM WebSphereMQ", *spiritcache, Use Case & Code Example, article*, (Nov. 19, 2004), 1-9.

"Class AbstractCacheAdministrator", http://www.jdocs.com/osche/2.0.2/api/com/opensymphony/oscache/base/AbstractCache.html, (Jan. 2004), 1-11.

"Class Cache", http://www.jdocs.com/osche/2.0.2/api/com/opensymphony/oscache/base/Cache.html, (Jan. 2004), 1-16.

"Class CacheEntry", http://www.jdocs.com/osche/2.0.2/api/com/opensymphony/oscache/base/CacheEntry.html, (Jan. 2004), 1-8.

"Class Config", http://www.jdocs.com/osche/2.0.2/api/com/opensymphony/oscache/base/Config.html, (Jan. 2004), 1-4.

"Failover for Clustered RMI-P4 Remote Objects", *SAP Library*, http://help.sap.com/saphelp_nw04/helpdata/en/f6/4ef11ab3a52f408aa8a133f33d6cf1/cont, (Nov. 2004), 1-3.

"Failover for Enterprise Beans", *SAP Library*, http://help.sap.com/saphelp_nw04/helpdata/en/8f/d6e45953a494499ea1b79ab16321d2/cont, (Nov. 2004), 1-3.

"Failover System", *SAP Library*, http://help.sap.com/saphelp_nw04/helpdata/en/d7/57af0cce55143be5de3a6e4911186.cont, (Nov. 2004), 2.

"High Availability and Failover", *SAP Library*, http://help.sap.com/saphelp_nw04/helpdata/en/6c/209da105668c45be12f1d9cc412e2b/cont, (Nov. 2004), 1-2.

"Http Sessions and Failover of Web Application", *SAP Library*, http://help.sap.com/saphelp_nw04/helpdata/en/90/044cc585eaba42b649f16181b0fdf/cont., (Nov. 2004), 1.

"Introducing Cache-Forward Architecture", *ObjectStore, paper*, (Jan. 1, 2004), 1-23.

"Java Technology in SAP Web Application Server", *SAP Library*, http://help.sap.com/saphelp_nw04/helpdata/en/0d/a3bbeff62847ae10000000a114084/cont, (Nov. 2004), 1-3.

"Java VineetB-log.java", http://homepage.mac.com/vineetb/iblog/C684524823/, (Dec. 18, 2003), 1.

"JCS Plugin Overview", http://jakarta.apache.org/jcs/Plugins.html, (Jul. 2004), 2.

"Load Balancing of the SAP Web As for Java Applications", *SAP Library*, http://help.sap.com/saphelp_nw04/helpdata/en/b5/e8239ef7bd494f896a84625d4b688f/cont., (Nov. 2004), 2.

"Managers—Intro", http://db.apache.org/torque-32/managers-cache.html, (Apr. 11, 2002), 1-4.

"Open Source Cache Solutions in Java", http://java-source.net/open-source/cache-solutions, (Nov. 2004), 1-3.

"OSCache", http://www.opensymphony.com/oscache, (Nov. 2004), 1.

"OSCache, V 2.0.2 API Specification", http://www.jdocs.com/osche/2.0.2/api/com/opensymphony/oscache/base/overview-sum.html, (Jan. 2004), 2.

"RMI Clients on SAP NetWeaver", *SAP Platform Ecosystem*, (2005), Whole Document.

"SAP Beefs Up Java Support Capabilities For New NetWeaver", *News Story, (Computerworld)*. http:www.computerworld.com/print-this/2004/0,4814,96558,00.html, (Oct. 11, 2004), 1-2.

"SAP NetWever Makes Standard Java Robust", http://www.sap.com/company/press/press.epx?pageview=print&pressid=3069, (Oct. 5, 2004), 1-2.

"SAP Presents New Capabilities for Netweaver", *InfoWorld*, http://www.infoworld.com/article/04/10/06/HNsapnetweaver_1.html, (Oct. 6, 2004), 1-5.

"Shared disk I/O cache", *IP.COM Journal, IP.COM Inc., West Henrietta*, XP013014199 ISSN: 1533-0001, (Jan. 29, 2004), 6.

"Spiritcache", http://www.spirit-soft.com/index.do?id=30, (Nov. 2004), 1.

"System and Method for Shared Memory/File System Java ObjectGroup Clustered JVM", http://www.priorartdatabase.com/IPCOM/000021597/, (Jan. 2004), 3.

"Using Rules-based Object Caching: Allocating dataresources for best service levels to profitable customers", *spiritcache, White paper*, (Nov. 2004), 1-8.

"WebLogic RMI Features and Guidelines", *eDocs*, http://e-docs.bea.com/wls/docs90/rmi/rmi_api.html, (Nov. 2004), 1-7.

Barrett, Ryan, "P4 Protocol Specification", (Sep. 2001), 1-12.

Bortvedt, Jerry, "Functional Specification for Object Caching Service for Java (OCS4J), 2.0", (Aug. 9, 2000), pp. 1-27.

Bryce, Ciaran, "Isolates: A New Approach to Multi-Programming in Java Platforms", *LogOn Technology Transfer*, Kronerg, Germany, *Experts' Corner*, (May 2004), 7.

Conte, Thomas, "Implementing OSCache", http://www.pas.net/tom/articles/oscache/en/, (Jun. 2002), 1-4.

Czajkowski, Grzegorz, et al., "A Multi-User Virtual Machine", *Paper, Sun Microsystems Laboratories and S3 Lab, Purdue University*, West Lafayette, IN, (2003), 14.

Czajkowski, Grzegorz, "Multitasking without Compromise: A Virtual Machine Evolution", *Paper, Sun Microsystems Laboratories*, (2001), 1-14.

Dagfinn, Parnas, "SAP Virtual Machine Container", https://weblogs.sdn.sap.com/pub/wlg/940, (Oct. 23, 2004), 1-4.

Davies, Robert, "Data Caching: A Prerequisite to the Enterprise Service Bus", *Business Integration Journal*, (Oct. 2003), 41-44.

Dillenbeger, D., et al., "Building a java Virtual Machine For Serve Applications: The Jvm On Os/390", *IBM Systems Journal*, vol. 39, No. 1, (2000), 194-210.

Doyle, Patrick, et al., "A Modular and Extensible JVM Infrastructure", *Paper, Edward S. Rogers Sr. Department of Electrical and Computer Engineering, University of Toronto*, Toronto, Ontario, Canada, (Jul. 2002), 14.

Dwarkadas, Sandhya, et al., "Cashmere-VLM: Remote Memory Paging for Software Distributed Shared Memory", *Paper, Compaq Cambridge Research Lab*, Cambridge, MA *and Department of Computer Science, University of Rochester*, Rochester, NY, (Apr. 1999), 7.

Ferguson, Renee B., "SAP Preps New NetWeaver Capabilities", eWeek.com, http://www.eweek.com/article2/0, 1759, 1668146,00.asp, (Oct. 7, 2004), 1-6.

Gontmakher, Alex, et al., "Characterizations for Java Memory Behavior", *Paper, Computer Science Department, Technion*, (1997), 5.

Handy, Jim, "The Cache Memory Book", *1998, Academic Press Inc, 2nd Edition*, pp. 60, vii-229, (1998), 3 Pages.

Hennessy, John, et al., "Computer Organization and Design", *Morgan Kaufmann Publishers Inc., 2nd Edition*, pp. 575-576, (1998), 3 Pages.

Jagannathan, et al., "High-Level Abstraction for Efficient Concurrent Systems", *NEC Research Institute, Section 5.2*, (Mar. 1994), 20., Section 5.2, (Mar. 1994), 20.

Jordan, Mick, et al., "Extending a J2EE Server with Dynamic and Flexible Resource Management", *Paper, Sun Microsystems, Inc, and School of Computer Science, University of Waterloo*, Waterloo, ON, Canada, (Oct. 2004), 20.

Jordan, Mick, et al., "Scaling J2EE Application Servers with the Multi-Tasking Virtual Machine", Paper, Sun Microsystems, SMLI TR-2004-135, Jun. 2004, pp. 1-19, *Paper, Sun Microsystems*, SMLI TR-2004-135, (Jun. 2004), 1-19.

JSR 107: JCACHE, "JSR 107: JCACHE", *Java Temporary Caching API*, Website, http://web1.jcp.org/en;jsr/detail?id=107, (Nov. 28, 2004), 4.

Kuck, Norbert, et al., "SAP VM Container: Using Process Attachable Virtual machines to Provide Isolation and Scalability For Large Servers", *Article, SAP AG*, Walldorf, Germany, (2002), 1-2.

Loosco, Marcelo, et al., "A New Distributed Java Virtual Machine for Cluster Computing", *Notes in Computer Science, Springer-Verlag*, v. 2790, (2003), 1207-1215.

Luck, Greg, "Ehcache 1.0 released", http://www.theserverside.com/news, (Oct. 9, 2004), 1-5.

March, Andres, "OSCache: Change Log", http://www.opensymphony.com/oscache/wiki/Change%20Log.html, (Jan. 18, 2004), 1-11.

Marinescu, Floyd, "SpiritSoft Announces Availability of SpiritCache 2.0", http://www.theserverside.com/news/thread.tss?thread_=18483, (Mar. 21, 2003), 1-5.

Movva, Sudhir, et al., "Transparent Clustered Database Failover Using JAVA", http://www.quest-pipelines.com/newsletter-v5/0604_A.html, (Apr. 2004), 11.

N/A, "Hierarchy For Package Oracle.ias.cache", http://download-west.oracle.com/docs/cd/B15904_01/web.1012/b14018/oracle/ias/cache/p . . . , (Nov. 2004), 2.

Parnas, Dagfinn, "SAP Virtual Machine Container", https://weblogs.sdn.sap.com/pub/wlg/940, (Oct. 23, 2004), 1-4.

Pawlan, Monica, "Reference Objects and Garbage Collection", *Sun Microsystems.*, (Aug. 1998), 8, 15 and 16.

Penchikala, Srini, "J2EE Object-Caching Frameworks", http://www.javaworld.com/javaworld/jw-05-2004/jw-0531-cache_p.html, (May 31, 2004), Whole Document.

Penchikala, Srini, "Object Caching in a Web Portal Application Using JCS", http://www.onjava.com/pub/a/onjava/2003/caching.html, (Dec. 23, 2003), 1-18.

Salo, Timo, et al., "Object Persistence Beyond Serialization", *Increasing Productivity and Reducing Maintenance, Dr. Dobb'Journal*, M7T Publ., vol. 24, No. 5, XP000925486. ISSN: 1044-789X., (May 1999), 5.

Salo, Timo, et al., "Persistence in Enterprise JavaBeans Applications", *JOOP*, XP-002142904., (Jul. 1999), 3.

Smits, Thomas, "Unbreakable Java—The Java Server that Never Goes Down", *Article, SAP TechED*, Nov. 2004, San Diego and Munich, (Nov. 2004), 1-5.

Srinivasan, V., et al., "Object Persistence in Object-Oriented Applications", *IBM Systems Journal, IBM Corp.*, vol. 36, No. 1, 1997, pp. 11, XP000685709, ISSN: 0018-8670., (1997).

Stark, Ian "Concurrent Programming In Java", *CS2 Advanced Programming in Java note 9, S2Bh*, (Jan. 3, 2002), 1-5.

Tullman, Patrick, et al., "Janos: A Java-Oriented OS for Active Network Nodes", *Paper, Flux Research Group, University of Utah*, (Mar. 2001), 14.

Wang, Ben, "Enter the JBoss Matrix", JBossCache 1.0 Released [online] [retrieved on Oct. 24, 2008] Retrieved from the Internet<URL:http://blogs.jboss.com/blog/nfleury/2004/03/25/JBossCache+1.0+Released.html>, (Mar. 25, 2004).

Wolf, Martin, "Administration of the SAP Web Application Server", *Seminar System Modeling 2005 Hasso-Plattner-Institute for Software Systems Engineering*, (2005), Whole Document.

\* cited by examiner

```xml
<!DOCTYPE cache-configuration SYSTEM "cache-configuration.dtd">
<cache-configuration>
    2401 →  <global-configuration TOTAL_SIZE="${MAX_MEM}/3"/>
    2403 →  <regions>
        2405 →  <region-configuration name="JNDI" enabled="false">
            2407 →  <count-thresholds start="10" upper="75" critical="100"/>
            2409 →  <size-thresholds start="102400" upper="768000" critical="1024000"/>
            2411 →  <scopes region="LOCAL" invalidation="LOCAL"/>
            2413 →  <plugins storage="CombinatorStorage" eviction="EvictionPolicy">
                2415 →  <storage-configuration>
                            <property value="DBStorage" key="BackendStoragePlugin"/>
                            <property value="CombinatorsStorage"
                                      key="FrontendStoragePlugin"/>
                        </storage-configuration>
                2417 →  <eviction-configuration>
                            <property value="5000" key="recentlyUsedPeriod"/>
                        </eviction-configuration>
            2419 →  </plugins>
            2421 →  <principal>com.sap.engine.services.jndi.JNDIManager</principal>
            2423 →  <direct-invalidation>FALSE</direct-invalidation>
            2425 →  <logging-mode>FALSE</logging-mode>
            2427 →  <synchronous>TRUE</synchronous>
                    <weight>100.0</weight>
        </region-configuration>
        2429 →  <region-configuration name="RMI" enabled="false">
            ...
        </region-configuration>
    </regions>
</cache-configuration>
```

FIG. 24

CACHE ISOLATION MODEL

TECHNICAL FIELD

Embodiments of the present invention relate to memory management, and in one embodiment, a method of maintaining cache coherency using a shared lock construct.

BACKGROUND

FIG. 1 shows a prior art computing system 100 having N virtual machines 113, 213, . . . N13. The prior art computing system 100 can be viewed as an application server that runs web applications and/or business logic applications for an enterprise (e.g., a corporation, partnership or government agency) to assist the enterprise in performing specific operations in an automated fashion (e.g., automated billing, automated sales, etc.).

The prior art computing system 100 runs are extensive amount of concurrent application threads per virtual machine. Specifically, there are X concurrent application threads ($112_1$ through $112_X$) running on virtual machine 113; there are Y concurrent application threads ($212_1$ through $212_Y$) running on virtual machine 213; . . . and, there are Z concurrent application threads ($N12_1$ through $N12_Z$) running on virtual machine N13; where, each of X, Y and Z are a large number.

A virtual machine, as is well understood in the art, is an abstract machine that converts (or "interprets") abstract code into code that is understandable to a particular type of a hardware platform. For example, if the processing core of computing system 100 included PowerPC microprocessors, each of virtual machines 113, 213 through N13 would respectively convert the abstract code of threads $112_1$ through $112_X$, $212_1$ through $212_Y$, and $N12_1$ through $N12_Z$ into instructions sequences that a PowerPC microprocessor can execute.

Because virtual machines operate at the instruction level they tend to have processor-like characteristics, and, therefore, can be viewed as having their own associated memory. The memory used by a functioning virtual machine is typically modeled as being local (or "private") to the virtual machine. Hence, FIG. 1 shows local memory 115, 215, N15 allocated for each of virtual machines 113, 213, . . . N13 respectively.

A portion of a virtual machine's local memory may be implemented as the virtual machine's cache. As such, FIG. 1 shows respective regions 116, 216, . . . N16 of each virtual machine's local memory space 115, 215, . . . N15 being allocated as local cache for the corresponding virtual machine 113, 213, . . . N13. A cache is a region where frequently used items are kept in order to enhance operational efficiency. Traditionally, the access time associated with fetching/writing an item to/from a cache is less than the access time associated with other place(s) where the item can be kept (such as a disk file or external database (not shown in FIG. 1)).

For example, in an object-oriented environment, an object that is subjected to frequent use by a virtual machine (for whatever reason) may be stored in the virtual machine's cache. The combination of the cache's low latency and the frequent use of the particular object by the virtual machine corresponds to a disproportionate share of the virtual machine's fetches being that of the lower latency cache; which, in turn, effectively improves the overall productivity of the virtual machine.

A problem with the prior art implementation of FIG. 1, is that, a virtual machine can be under the load of a large number of concurrent application threads; and, furthermore, the "crash" of a virtual machine is not an uncommon event. If a virtual machine crashes, generally, all of the concurrent application threads that the virtual machine is actively processing will crash. Thus, if any one of virtual machines 113, 213, N13 were to crash, X, Y or Z application threads would crash along with the crashed virtual machine. With X, Y and Z each being a large number, a large number of applications would crash as a result of the virtual machine crash.

Given that the application threads running on an application server 100 typically have "mission critical" importance, the wholesale crash of scores of such threads is a significant problem for the enterprise.

The Java programming language provides for object synchronization which stops two threads from accessing the same object at the same time. This objected is "locked." Any object can be locked and only one thread may hold this lock at one time. In other words, an exclusive lock is put on the object.

Locks in Java are not explicitly set but instead are generated by executing a synchronized method. For example the generic code below synchronizes an object:

synchronized (object) {statements}.

This method is based on the concepts of monitors and locks. A monitor is basically a protective wrapper around a critical code section and a lock is a software entity that a monitor uses to prevent multiple threads from entering the monitor. When a thread wishes to enter a monitor-guarded critical code section that thread must acquire the lock associated with an object that associates with the monitor (each object has its own lock). If some other thread holds that lock, the virtual machine (VM) forces the requesting thread to wait in a waiting area associated with the monitor/lock. When the thread in the monitor releases the lock, the VM removes one of the waiting threads from the monitor's waiting area and allows that thread to acquire the lock and proceed to the monitor's critical code section. However, shared locks and intentional locks are not supported.

SUMMARY

Systems and methods for a treatment of objects are described. In one embodiment, cache isolation between worker nodes, threads, and/or virtual machines of the same application may be achieved using shared locks and/or synchronization. Isolation between threads or virtual machines of the same application may be provided by using the previously described locker construct and/or synchronization. If both the application and cache manager support the locker construct each operation may be executed exclusively of all others.

BRIEF DESCRIPTION OF THE DRAWINGS

The present invention is illustrated by way of example, and not limitation, in the figures of the accompanying drawings in which:

FIG. 9 illustrates one embodiment of different programming models for a storage plug-in.

FIG. 13a illustrates an embodiment of an eviction policy plug-in.

FIG. 13b illustrates a detailed perspective of various types of queues that may be implemented by the Sorting component of an eviction policy plug-in.

FIG. 24 illustrates an exemplary XML document.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product that may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPOMs, magnetic or optical cards, flash memory, or other type of media/machine-readable medium suitable for storing electronic instructions.

Shared Memory and Shared Closures

Figure 1:
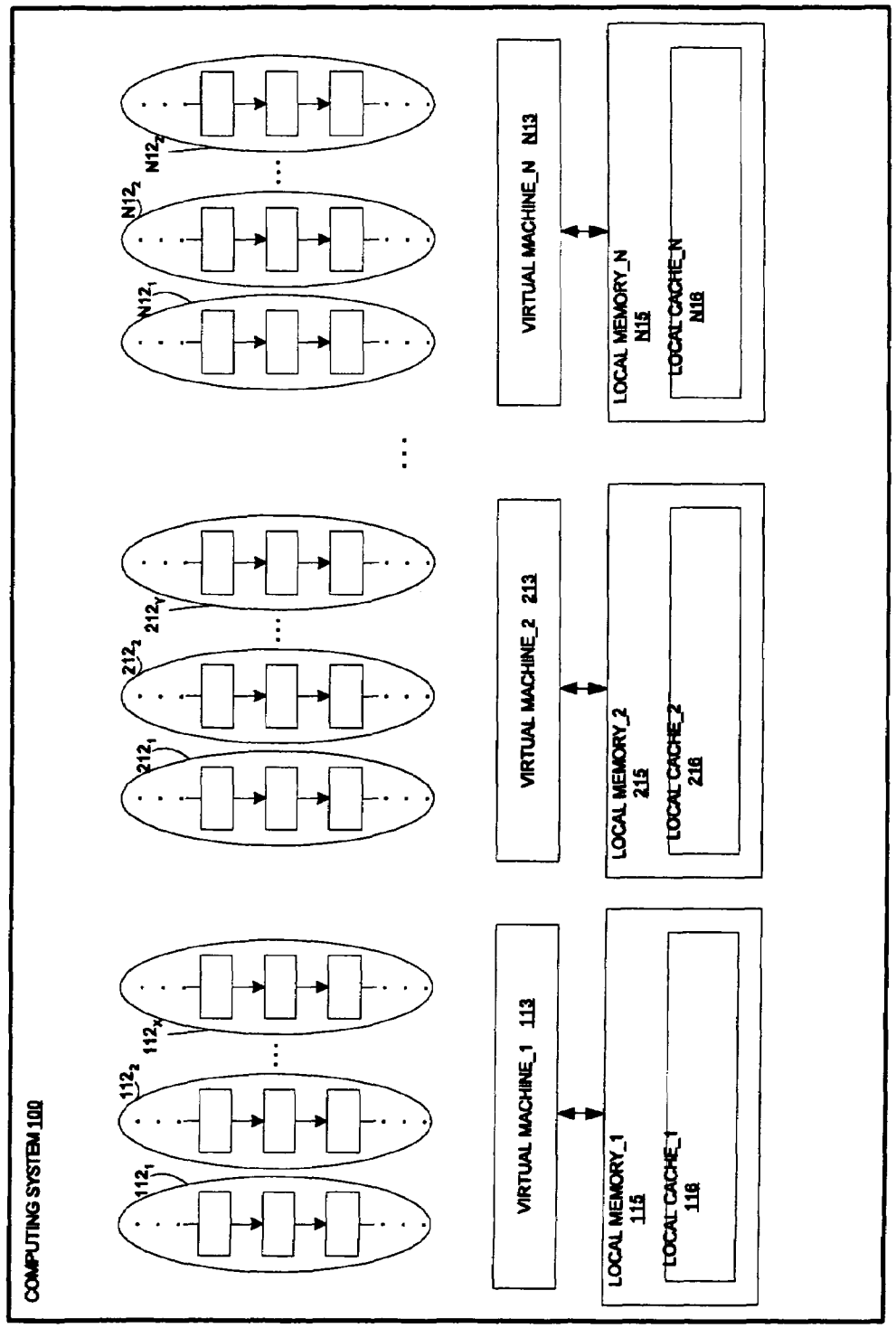
FIG. 1 shows a portion of a prior art computing system.
Figure 2:
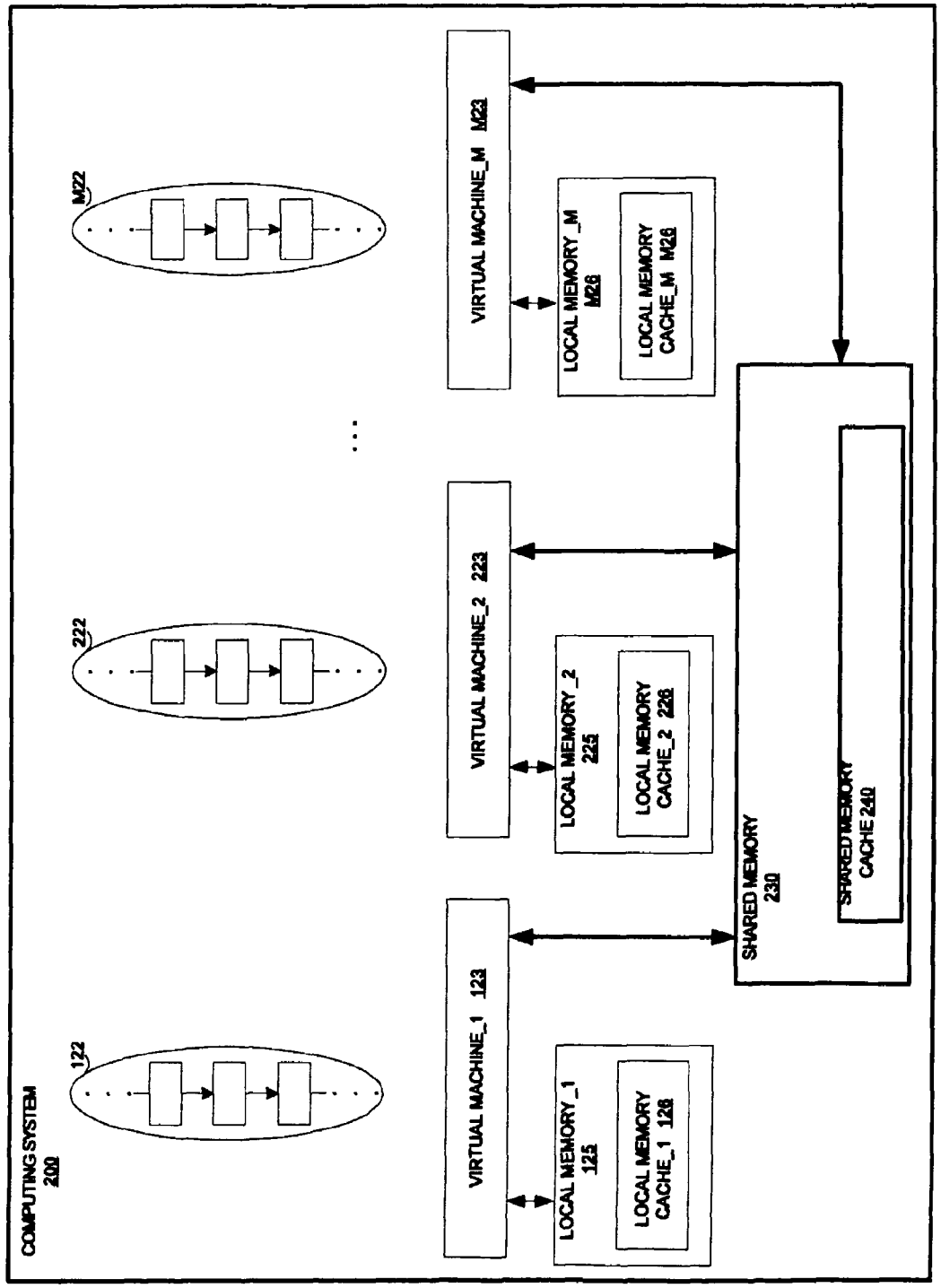
FIG. 2 shows a portion of an improved computing system.

FIG. 2 shows a computing system 200 that is configured with less application threads per virtual machine than the prior art system of FIG. 1. Less application threads per virtual machine results in less application thread crashes per virtual machine crash; which, in turn, should result in the new system 200 of FIG. 2 exhibiting better reliability than the prior art system 100 of FIG. 1.

According to the depiction of FIG. 2, which is an extreme representation of the improved approach, only one application thread exists per virtual machine (specifically, thread 122 is being executed by virtual machine 123; thread 222 is being executed by virtual machine 223, . . . and, thread M22 is being executed by virtual machine M23). In practice, the computing system 200 of FIG. 2 may permit a limited number of threads to be concurrently processed by a single virtual machine rather than only one.

In order to concurrently execute a comparable number of application threads as the prior art system 100 of FIG. 1, the improved system 200 of FIG. 2 instantiates more virtual machines than the prior art system 100 of FIG. 1. That is, M>N.

Thus, for example, if the prior art system 100 of FIG. 1 has 10 application threads per virtual machine and 4 virtual machines (e.g., one virtual machine per CPU in a computing system having four CPUs) for a total of 4×10=40 concurrently executed application threads for the system 100 as a whole, the improved system 200 of FIG. 2 may only permit a maximum of 5 concurrent application threads per virtual machine and 6 virtual machines (e.g., 1.5 virtual machines per CPU in a four CPU system) to implement a comparable number (5×6=30) of concurrently executed threads as the prior art system 100 in FIG. 1.

Here, the prior art system 100 instantiates one virtual machine per CPU while the improved system 200 of FIG. 2 can instantiate multiple virtual machines per CPU. For example, in order to achieve 1.5 virtual machines per CPU, a first CPU will be configured to run a single virtual machine while a second CPU in the same system will be configured to run a pair of virtual machines. By repeating this pattern for every pair of CPUs, such CPU pairs will instantiate 3 virtual machines per CPU pair (which corresponds to 1.5 virtual machines per CPU).

Recall from the discussion of FIG. 1 that a virtual machine can be associated with its own local memory. Because the improved computing system of FIG. 2 instantiates more virtual machines that the prior art computing system of FIG. 1, in order to conserve memory resources, the virtual machines 123, 223, . . . M23 of the system 200 of FIG. 2 are configured with less local memory space 125, 225, . . . M25 than the local memory space 115, 215, . . . Nl5 of virtual machines 113, 213, . . . N13 of FIG. 1. Moreover, the virtual machines 123, 223, . . . M23 of the system 200 of FIG. 2 are configured to use a shared memory 230. Shared memory 230 is memory space that contains items that can be accessed by more than one virtual machine (and, typically, any virtual machine configured to execute "like" application threads that is coupled to the shared memory 230).

Thus, whereas the prior art computing system 100 of FIG. 1 uses fewer virtual machines with larger local memory resources containing objects that are "private" to the virtual machine; the computing system 200 of FIG. 2, by contrast, uses more virtual machines with less local memory resources. The less local memory resources allocated per virtual machine is compensated for by allowing each virtual machine to access additional memory resources. However, owing to limits in the amount of available memory space, this additional memory space 230 is made "shareable" amongst the virtual machines 123, 223, . . . M23.

According to an object oriented approach where each of virtual machines 123, 223, . . . M23 does not have visibility into the local memories of the other virtual machines, specific rules are applied that mandate whether or not information is permitted to be stored in shared memory 230. Specifically, to first order, according to an embodiment, an object residing in shared memory 230 should not contain a reference to an object located in a virtual machine's local memory because an object with a reference to an unreachable object is generally deemed "non useable".

That is, if an object in shared memory 230 were to have a reference into the local memory of a particular virtual machine, the object is essentially non useable to all other virtual machines; and, if shared memory 230 were to contain an object that was useable to only a single virtual machine, the purpose of the shared memory 230 would essentially be defeated.

In order to uphold the above rule, and in light of the fact that objects frequently contain references to other objects (e.g., to effect a large process by stringing together the processes of individual objects; and/or, to effect relational data structures), "shareable closures" are employed. A "closure" is a group of one or more objects where every reference stemming from an object in the group that references another object does not reference an object outside the group. That is, all the object-to-object references of the group can be viewed as closing upon and/or staying within the confines of the group itself. Note that a single object without any references stemming from can be viewed as meeting the definition of a closure.

If a closure with a non shareable object were to be stored in shared memory 230, the closure itself would not be shareable with other virtual machines, which, again, defeats the purpose of the shared memory 230. Thus, in an implementation, in order to keep only shareable objects in shared memory 230 and to prevent a reference from an object in shared memory 230 to an object in a local memory, only "shareable" (or "shared") closures are stored in shared memory 230. A "shared closure" is a closure in which each of the closure's objects are "shareable."

A shareable object is an object that can be used by other virtual machines that store and retrieve objects from the shared memory 230. As discussed above, in an embodiment, one aspect of a shareable object is that it does not possess a reference to another object that is located in a virtual machine's local memory. Other conditions that an object must meet in order to be deemed shareable may also be effected. For example, according to a particular Java embodiment, a shareable object must also posses the following characteristics: 1) it is an instance of a class that is serializable; 2) it is an instance of a class that does not execute any custom serializing or deserializing code; 3) it is an instance of a class whose base classes are all serializable; 4) it is an instance of a class whose member fields are all serializable; 5) it is an instance of a class that does not interfere with proper operation of a garbage collection algorithm; 6) it has no transient fields; and, 7) its finalize ( ) method is not overwritten.

Exceptions to the above criteria are possible if a copy operation used to copy a closure into shared memory 230 (or from shared memory 230 into a local memory) can be shown to be semantically equivalent to serialization and deserialization of the objects in the closure. Examples include instances of the Java 2 Platform, Standard Edition 1.3 java.lang.String class and java.util.Hashtable class.

Cache Management Across Local and Shared Memory Resources

Figure 3:
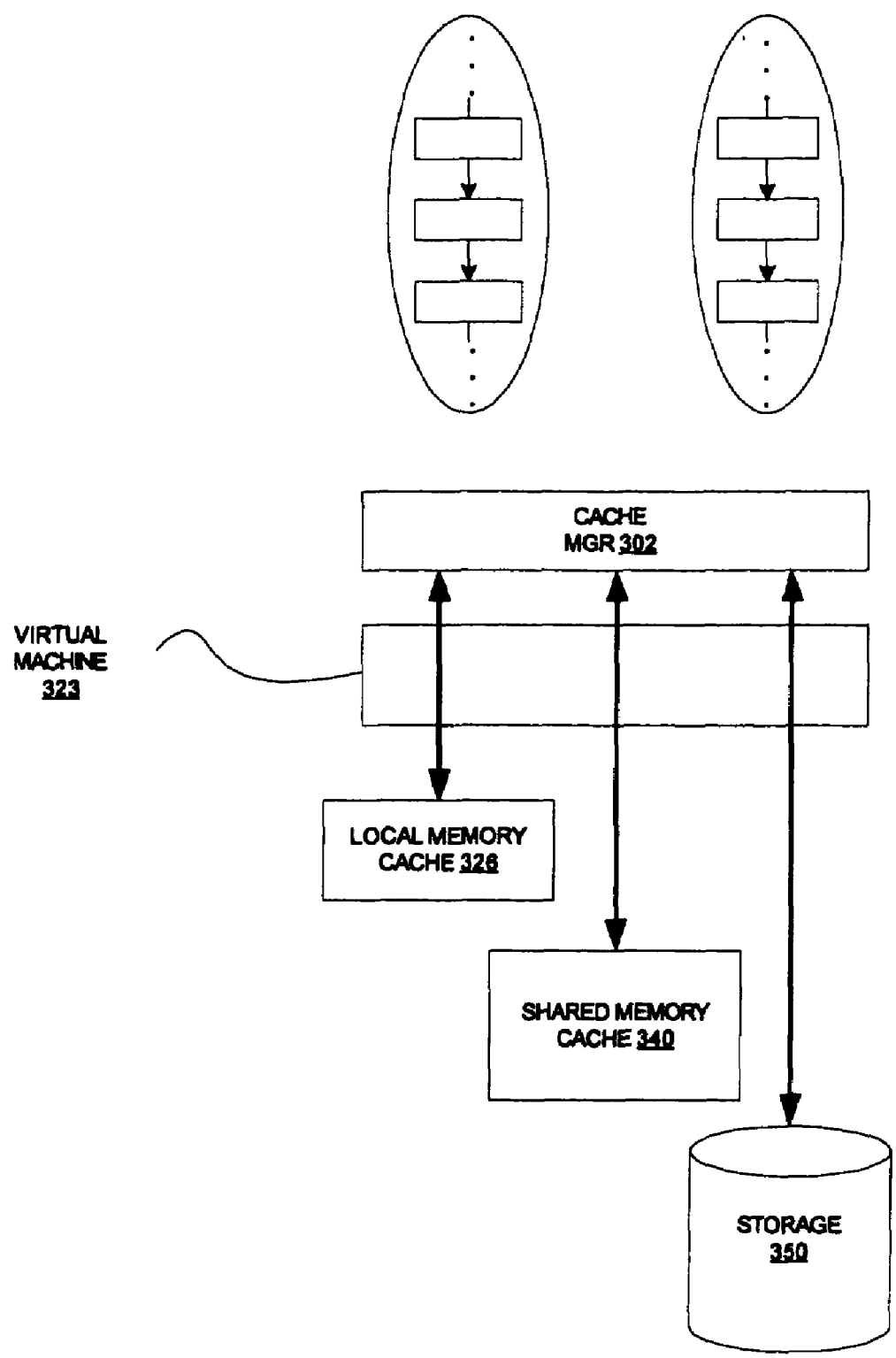
FIG. 3 shows a cache management service.

Note that the introduction of the shared memory 230 introduces the prospect of a shared cache 240. Thus, the architecture of FIG. 2 includes both local memory level caches 126, 226, . . . M26 and a shared memory cache 240. FIG. 3 shows a depiction of a cache management service 302 that can, for example, be added to the suite of services offered by a container 301 that an application thread runs in. A container is used to confine/define the operating environment for the application thread(s) that are executed within the container. In the context of J2EE, containers also provide a family of services that applications executed within the container may use (e.g., (e.g., Java Naming and Directory Interface (JNDI), Java Database Connectivity (JDBC), Java Messaging Service (JMS) among others).

Different types of containers may exist. For example, a first type of container may contain instances of pages and servlets for executing a web based "presentation" for one or more applications. A second type of container may contain granules of functionality (generically referred to as "components" and, in the context of Java, referred to as "beans") that reference one another in sequence so that, when executed according to the sequence, a more comprehensive overall "business logic" application is realized (e.g., stringing revenue calculation, expense calculation and tax calculation components together to implement a profit calculation application).

FIG. 3 shows that more than one thread can be actively processed by the virtual machine 323 depicted therein. It should be understood that, in accordance with the discussion concerning FIG. 2, the number of threads that the virtual machine 323 can concurrently entertain should be limited (e.g., to some fixed number) to reduce the exposure to a virtual machine crash. For example, according to one implementation, the default number of concurrently executed threads is 5. In a further implementation, the number of concurrently executed threads is a configurable parameter so that, conceivably, for example, in a first system deployment there are 10 concurrent threads per virtual machine, in a second system deployment there are 5 concurrent threads per virtual machine, in a third system deployment there is 1 concurrent thread per virtual machine. It is expected that a number of practical system deployments would choose less than 10 concurrent threads per virtual machine.

The cache management service 302 is configured to have visibility into the local memory cache 325 of the virtual machine 323, the shared memory cache 340 and one or more other storage resources 350 such as a database or file system used for storing persisted objects. Here, as will be described in more detail below, different applications whose abstract code (e.g., Java byte code in the case of Java) is executed by virtual machine 323 can specially configure the cache management service 302 to treat its cached objects in accordance with specific guidelines.

According to various schemes, the cache manager 302 effectively configures regions of cache for the storage of objects in local cache memory 326 and/or in shared memory cache 340 according to different treatment policies. Multiple cache regions defining different cache treatments may be established for a single application. Cached objects placed in local memory cache 326 may be conveniently utilized by the virtual machine 323 associated with the local memory where local cache 326 resides for quick processing by the application. By contrast, cached objects placed in shared memory cache 340 may be utilized by the local virtual machine 323 as well as other virtual machines that have visibility into the shared memory in which the shared memory cache 340 is implemented.

Figure 4:
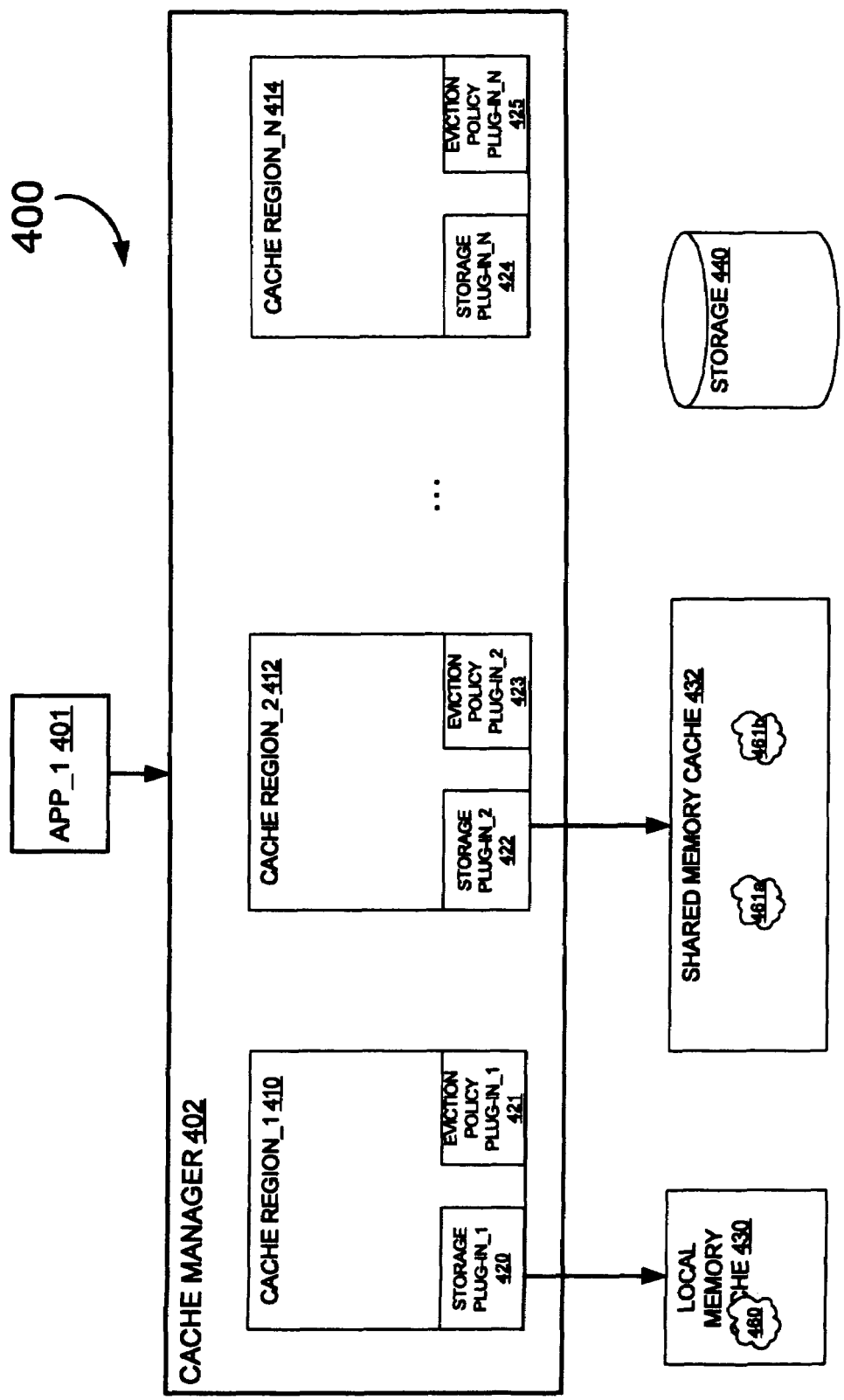
FIG. 4 illustrates one embodiment of a cache implementation with respect to local memory and shared memory.

FIG. 4 illustrates a more detailed perspective of an embodiment of the cache manager 302 of FIG. 3. Specifically, FIG. 4 illustrates the formation of multiple cache regions (cache region_1 410, cache region_2 412, ... cache region_N 414) that are controlled by cache manager 402. In one embodiment, a plurality of cache regions may be controlled by cache manager 402 for a single application. The cache regions may, for example, be formed by commands executed by an application (e.g., app_1 401) calling for the establishment of the cache regions themselves.

A cache region effectively determines the treatment that an object that is stored in the cache region will receive. For example, cache region_1 410 determines the treatment of object 460, while cache region_2 412 determines the treatment of cached object 461. By comparison, object 460 will receive different treatment than object 461 because of the different treatment imposed by the different cache regions 410, 412.

For each cache region, in an embodiment, cache manager 402 implements a storage plug-in and an eviction policy plug-in. The storage plug-in may be, in one embodiment, the actual piece of software or code that executes the "get" and "put" operations for the objects stored according to the treatment determined by the associated cache region. That is, for example, whether the object is placed in the local memory cache, the shared memory cache, or some other type of storage resource such as a database or file system for storing persisted objects. The eviction policy plug-in may be, in one embodiment, the actual piece of software or code that dictates the removal of an object from cache (e.g., when some form of cache capacity threshold is exceeded).

In continuing from the example provided above, cache region_1 410 defines the treatment of object 460 with storage plug-in_1 420 and eviction policy plug-in_1 421. Cache region_2 412 defines the treatment of object 461 with storage plug-in_2 422 and eviction policy plug-in_2 423. Cache region_N 414 is generally represented as having storage plug-in_N 424 and eviction policy plug-in_N 425. For simplicity of description, each cache region is described as having only a single object that is treating according to the treatment determined by the cache region, but, it should be appreciated that any number of objects may be referenced by a particular cache region. Moreover, any object stored in, copied from, written to, or removed from the shared memory cache 432 may be a single object; or, an object that is part of a shared closure where the shared closure itself is respectively stored in, copied from, written to, or removed from the shared memory cache 432.

As illustrated in FIG. 4, a storage policy plug-in of a cache region may dictate that an object stored in the local and/or shared cache memory be copied into a persisted storage space 440 (e.g., as part of the object's removal from the cache). One type of eviction process, referred to as "spooling," initiates persistence of the object upon the object's eviction from cache. As such, the evicted object is written into deeper storage space such as a hard disk file or a remote database 440. Another or related storage policy plug-in function may be used to perform a "write-through" process, in which a "put" of an object into cache automatically results in a copy of that object being directed to storage space 440.

Until now, a cache region (e.g., cache region_1 410) has been generally described as defining the treatment for a particular object, that is, for putting and/or getting an object to/from either the local memory cache and/or the shared memory cache. The following provides greater detail as to the different types of cache regions that may be implemented by cache manager 402 for the treatment of objects as defined by its storage and eviction policy plug-ins. The different types of cache management treatments are referred to as "flavors" or "cache flavors".

Cache Management Flavors

Figure 5:
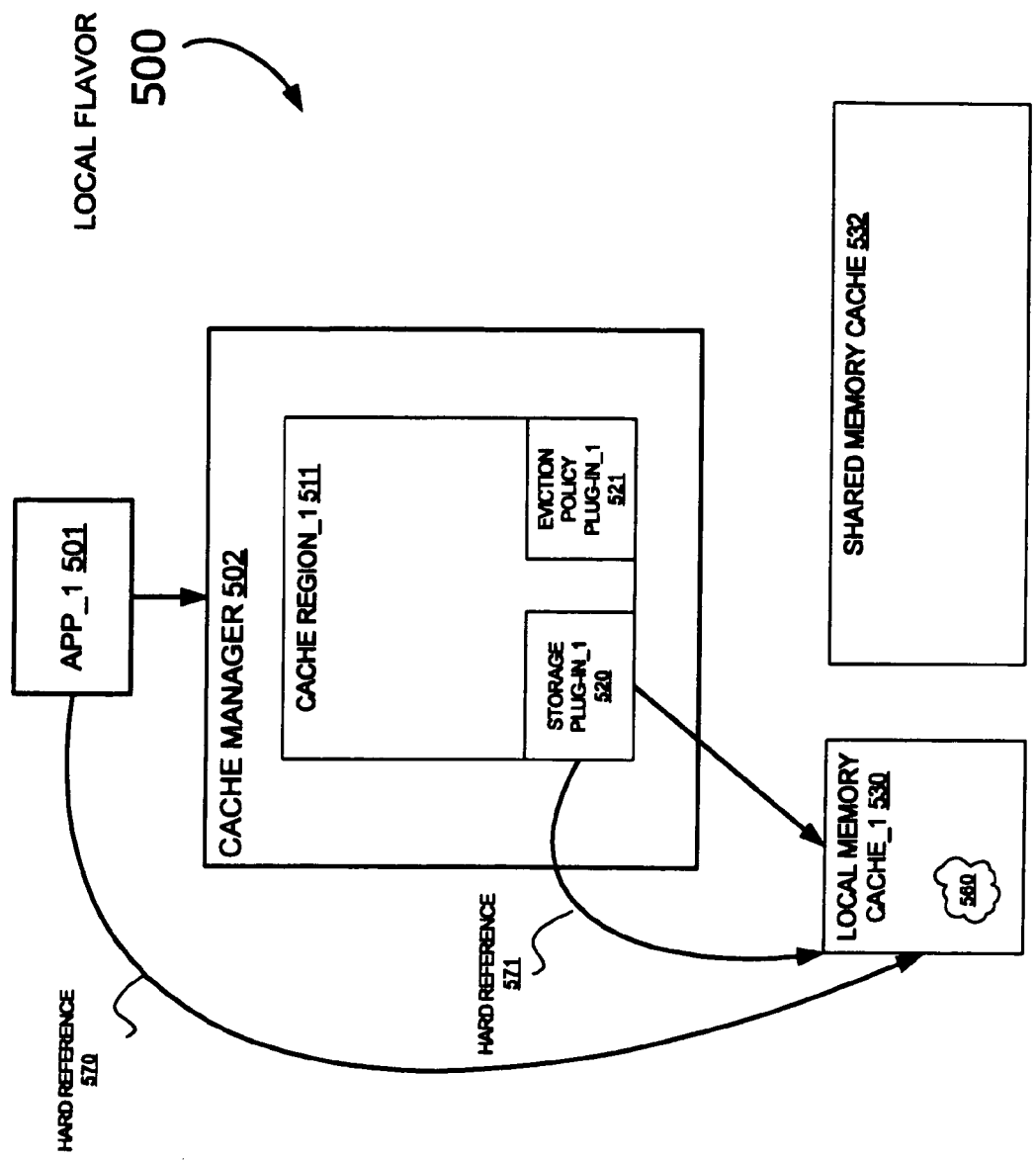
FIG. 5 illustrates an embodiment of a first cache region flavor.

FIG. 5 illustrates an embodiment of the first cache region flavor 500, referred to as "Local", which has object treatment behavior defined by cache region_1 511. Cache region_1 511 managed by cache manager 502 includes a "local" flavor storage plug-in_1 520 and eviction policy plug-in_1 521 that together implement the treatment of objects that are cached within the first cache region. The local flavor is useable with non-shareable objects that have no potential for storage into shared memory. The essence of the local flavor is that an object 560 is kept in local memory cache 530 and not shared memory cache 532; and, that hard reference(s) 570, 571 are made to the object 560 so that the object 560 cannot be removed from the local memory cache 530 by a "garbage collector." A garbage collector, which is a well known process, removes objects from local memory cache 530 (depending on the local memory usage and the type of references being made to the objects). Note that the garbage collector is a background process that is different than the eviction policy processes instituted by the eviction policy plug-in 521.

As shown in FIG. 5, according to the "local" flavor, a first "hard" reference 570 is made by application_1 501 to object 560 (at least while the object 560 is actively being used by the application 501), and a second "hard" reference 571 is made to the object 560 by storage plug-in_1 520. A particular type of reference to an object represents, in one embodiment, a relative difficulty level in removing an object from the memory cache. A "hard" (or "strongly reachable") referenced object remains in the memory (e.g., the object is not removed from local memory 530 by the garbage collector). A "soft" referenced object remains in the memory until there is a danger of OutofMemoryError (e.g., threshold level is exceeded in terms of available local memory space) or some other algorithm (typically based on memory usage) used by the garbage collector. A "weak" referenced object is removed by the garbage collector regardless of the local memory's available space. A java VM implementation is allowed however, to treat soft references like weak references (e.g., softly referred to objects are removed by the garbage collector irrespective of memory usage).

Active removal of an object by the eviction policy plug-in (e.g., eviction) ignores the referenced states of the object as described above. As such, hard referenced objects may be just as easily removed as weak referenced objects according to the policies set forth by the eviction policy plug-in 521. Here, note that storage plug-in 520 may also institute "spooling" and "write through" policies to deeper storage. In an embodiment, a separate plug-in in cache region 511 (not shown) is used to interface with the deeper storage and is called upon as needed by storage plug-in 520 to institute spooling and write through policies.

Figure 6:
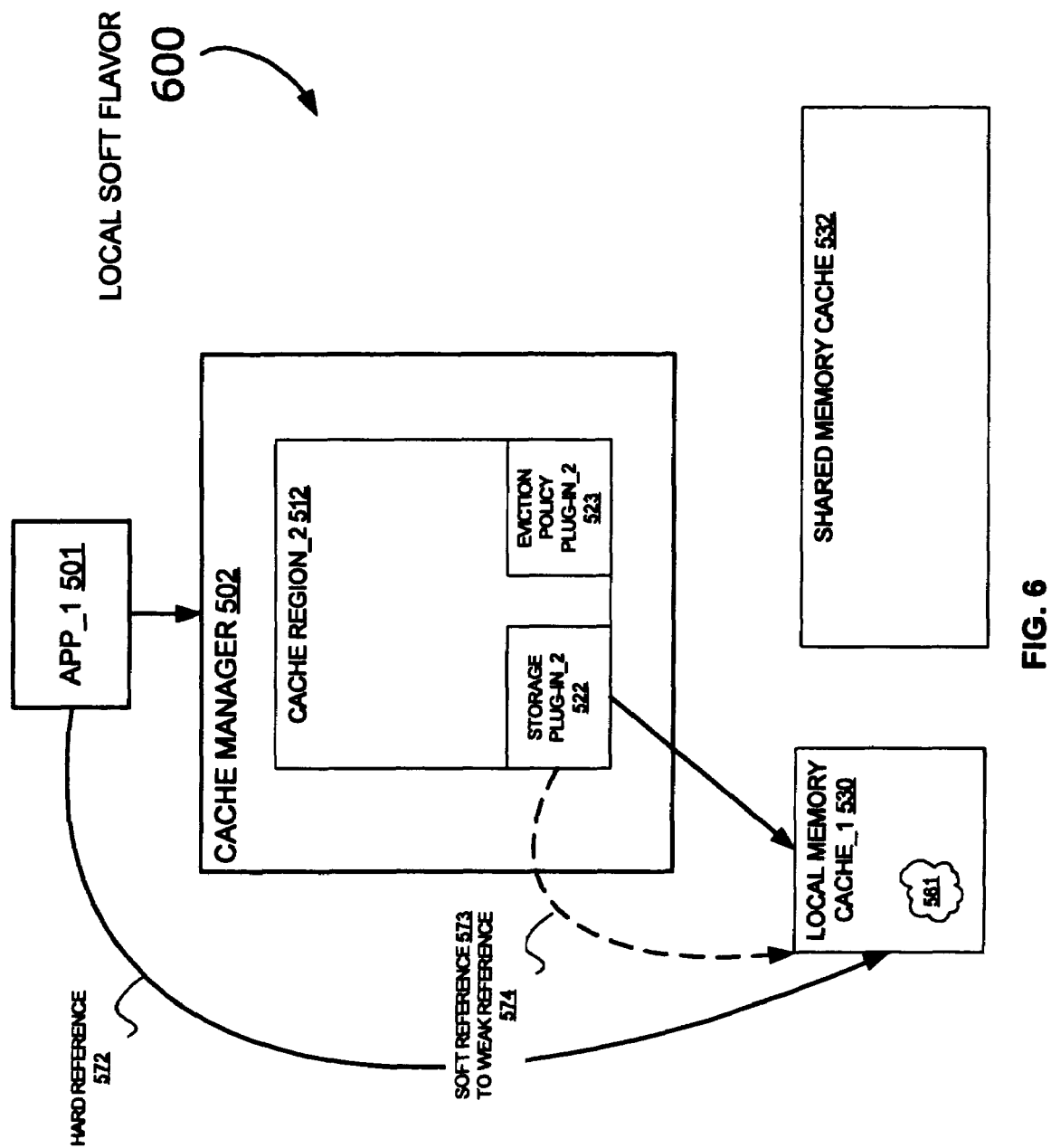
FIG. 6 illustrates an embodiment of a second cache region flavor.

FIG. 6 illustrates an embodiment of a second cache region flavor 600 referred to as "Local Soft." The Local Soft flavor is similar to the Local flavor of FIG. 5 but is different with respect to the references made to the object 561 by the storage plug-in 522. In particular, storage plug-in_2 522 does not maintain a hard reference to object 561 in local memory cache_1 530. Instead, a soft reference 573 is established. With a soft reference, according to one embodiment, object 561 remains in local memory cache_1 530 until the eviction policy plug-in raises some type of memory availability concern, at which time an active eviction process is invoked by eviction policy plug-in_2 523.

When the active eviction process is invoked, soft reference 573 is changed to a weak reference 574. Under this condition, object 561 may be removed by a garbage collector if the application's hard reference no longer exists (e.g., because the application is no longer actively using the object 561). That is, object 561 remains protected from removal by the garbage collector as long as the application's hard reference 572 to the object 561 is present, otherwise the object will be removed. Here, note that storage plug-in 522 may also institute "spooling" and "write through" policies to deeper storage. In an embodiment, a separate plug-in in cache region 512 (not shown) is used to interface with the deeper storage and is called upon as needed by storage plug-in 522 to institute spooling and write through policies. In one embodiment, by invoking the removal of object 560 from local memory cache_1 530 (either by active eviction or garbage collection), cache region_2 512 may also provide for object 560 to be copied to deeper storage.

Before moving forward it is important to re-emphasize that objects stored according to either of the local flavors discussed above may be of the non shareable type so as to be incapable of membership in a shared closure and storage into shared memory. Moreover, the application is apt to configure its different local cache regions such that objects receiving local flavor treatment are apt to be more heavily used (e.g., some combination of the number of "get" and "put" accesses over time) than objects treated according to the Soft Local flavor.

Figure 7:
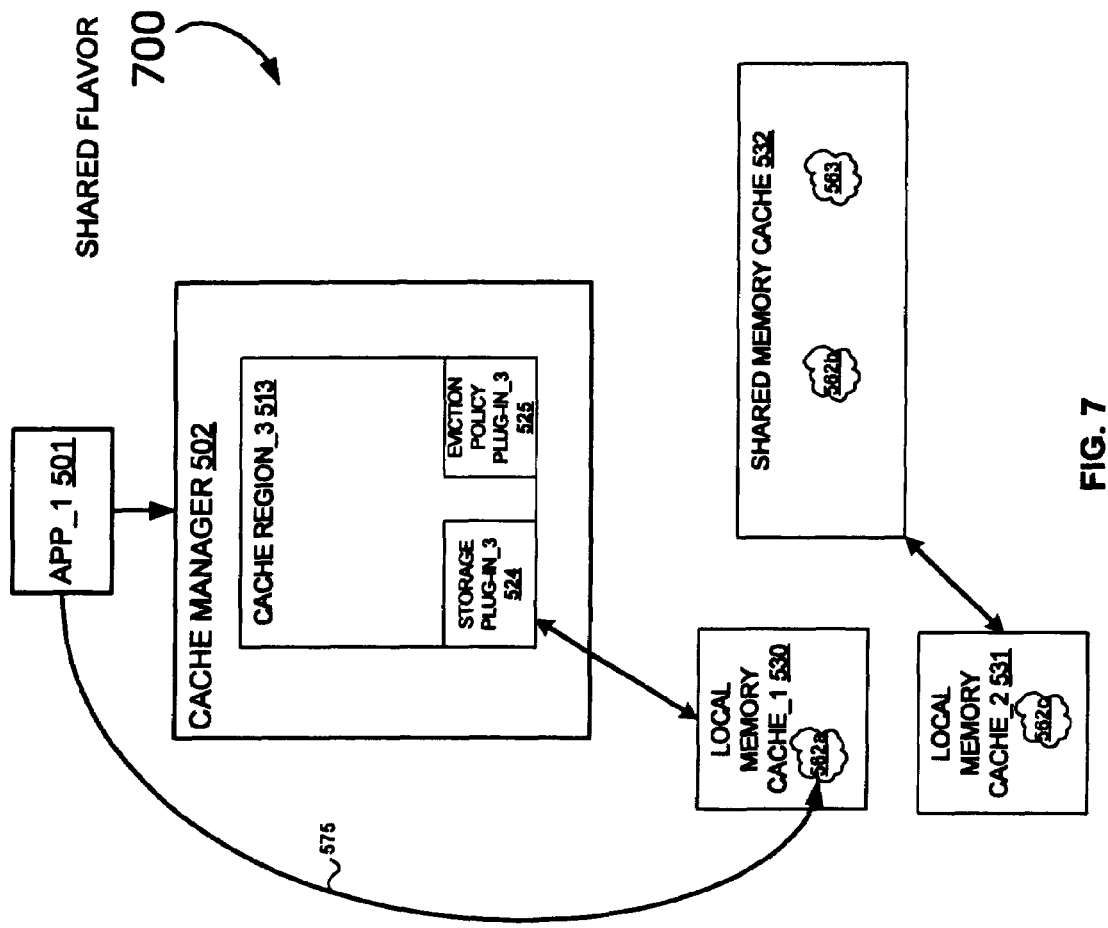
FIG. 7 illustrates an embodiment of a third cache region flavor.

FIG. 7 illustrates an embodiment of a third flavor 700 referred to as "Shared." The "Shared" flavor is different from both the Local flavors in that an object representation resides in shared memory cache 532 as part of a shared closure. Under the "shared" flavor, when an application 501 causes an object 562a to be first "put" into local memory cache, the storage plug-in 524 also puts a copy 562b of the object 562a into the shared memory cache 520. The application 501 places a hard reference 575 to the local copy 561a.

The application 501 is then free to use the local copy 562a as a "work horse" object. For each "put" operation made to the local copy 562a, (e.g., to effectively modify the object's earlier content) the storage plug-in 524 updates/writes to the shared copy 562b to reflect the "put" into the local memory cache 530. Note that because of the presence of shared copy 562b, a virtual machine other than the virtual machine that is associated with the local memory within which local memory cache_1 530 is implemented may copy the shared copy 562b into its local memory cache (e.g., local memory cache 531) so as to create a third copy 562c of the object. The third copy 562c of the object can be used as a "work horse" object for another application (not shown) that runs off of the other local memory cache 531. This other application will make a hard reference to this object 562c as well (not shown). In one embodiment, storage plug-in 524 does not place any kind of reference to shared copy 562b because any shared closure is reachable in shared memory through a key name that uniquely identifies that shared closure; and moreover, shared closures are kept in shared memory until an application explicitly calls a "delete" operation (e.g., no garbage collection process is at work in shared memory at least for cached objects). As such, there is no need for any type of reference to a shared closure residing in shared memory.

If the other application associated with local memory cache_2 531 effectively modifies its local object 562c (e.g., with a "put" operation), the storage plug-in for local memory cache_2 531 will create a "second version" 563 of shared object 562b in shared memory cache 532 that incorporates the modification made to local object 562c. According to an implementation, the storage plug-in 524 does not receive any affirmative indication of the existence of the new version but is instead configured to look for new versions in shared memory (e.g., upon a "put" or "get" operation) given the possibility of their existence under the shared flavor scheme. For instance, a "get" operation by application 501 will result in the reading of object 562a and object 563 by plug-in 524. Likewise, a "put" operation by application 501 can result in the fetching of object 563 by plug-in 524 so that it is possible to modify a local copy of the object 563 version. Here, note that storage plug-in 524 may also institute "spooling" and "write through" policies to deeper storage. In an embodiment, a separate plug-in in cache region 513 (not shown) is used to interface with the deeper storage and is called upon as needed by storage plug-in 524 to institute spooling and write through policies.

Figure 8:
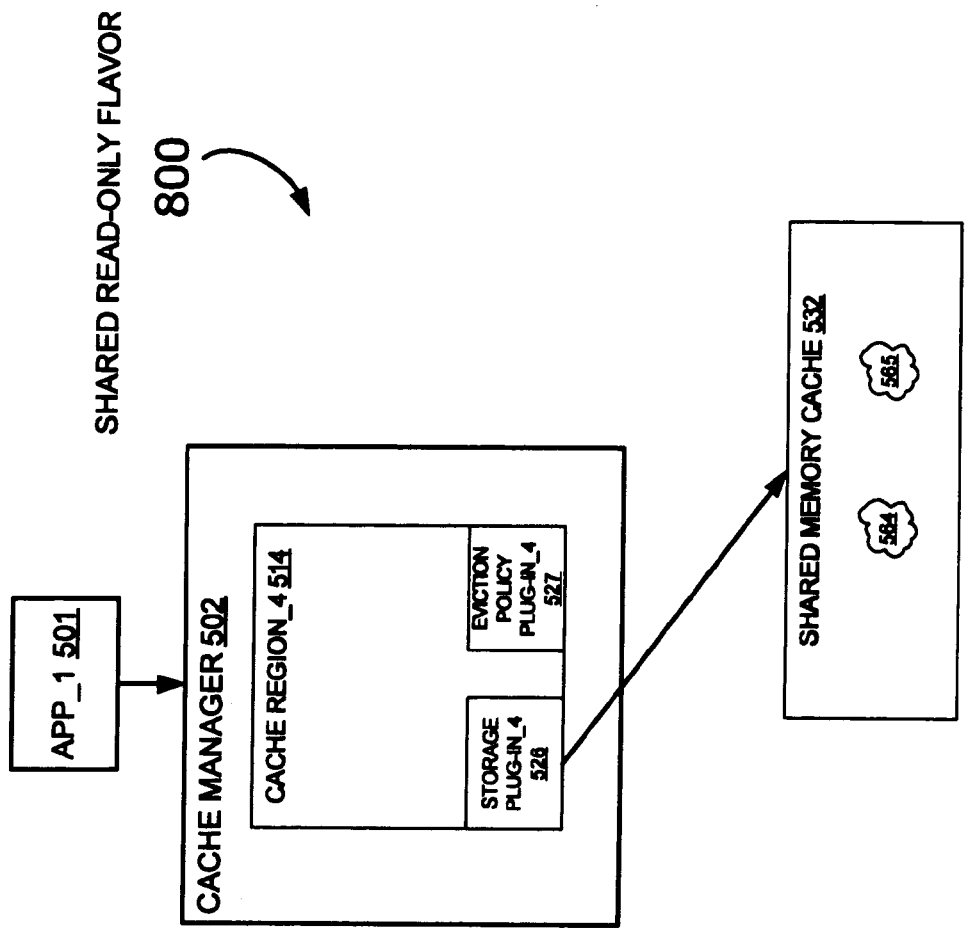
FIG. 8 illustrates an embodiment of a fourth cache region flavor.

FIG. 8 shows another shared memory based flavor that may be referred to as "Shared Read-Only." The essence of the Shared Read-Only approach is that local copies do not exist (e.g., only an object 564 in shared memory cache 532 exists); and, no modification is supposed to be made to the shared object under typical circumstances. The eviction policy plug-in 527 determines when the object 564 does not need to reside in shared memory cache 532 any longer.

In an extended embodiment, if a requirement to modify the object 564 arises, the storage plug-in 526 associated with the application 501 that desires to make the modification creates an entirely new object and places it into the shared memory 532 as a second version 565. Subsequently, when object 564 is requested from shared memory 532 by another application, the updated, second version 565 may also be retrieved. Here, note that storage plug-in 526 may also institute "spooling" and "write through" policies to deeper storage. In an embodiment, a separate plug-in in cache region 514 (not shown) is used to interface with the deeper storage and is called upon as needed by storage plug-in 526 to institute spooling and write through policies.

For either of the shared flavors discussed above, the storage plug-in may be configured to control the size of the shared closures that are being entered into shared memory cache 532. Specifically, smaller shared closures may be "bundled"

with other shared closures to form effectively a data structure that contains multiple shared closures and that is effectively treated as a single shared closure for copying operations from shared memory cache 532 into local memory cache 530 (or vice versa). Here, a bundle may be created simply by ensuring that each shared closure in the bundle is associated through a reference to another shared closure in the bundle.

By increasing bundle size, overhead associated with copying objects back and forth between shared memory and local memory is reduced in certain circumstances, particularly, environments where many smaller shared closures are to be sent between shared memory and local memory at about the same time. Here, by bundling them, all shared closures can effectively be transported between shared memory and local memory by a single transfer process.

Storage Plug-In Programming Models

Figure 9:
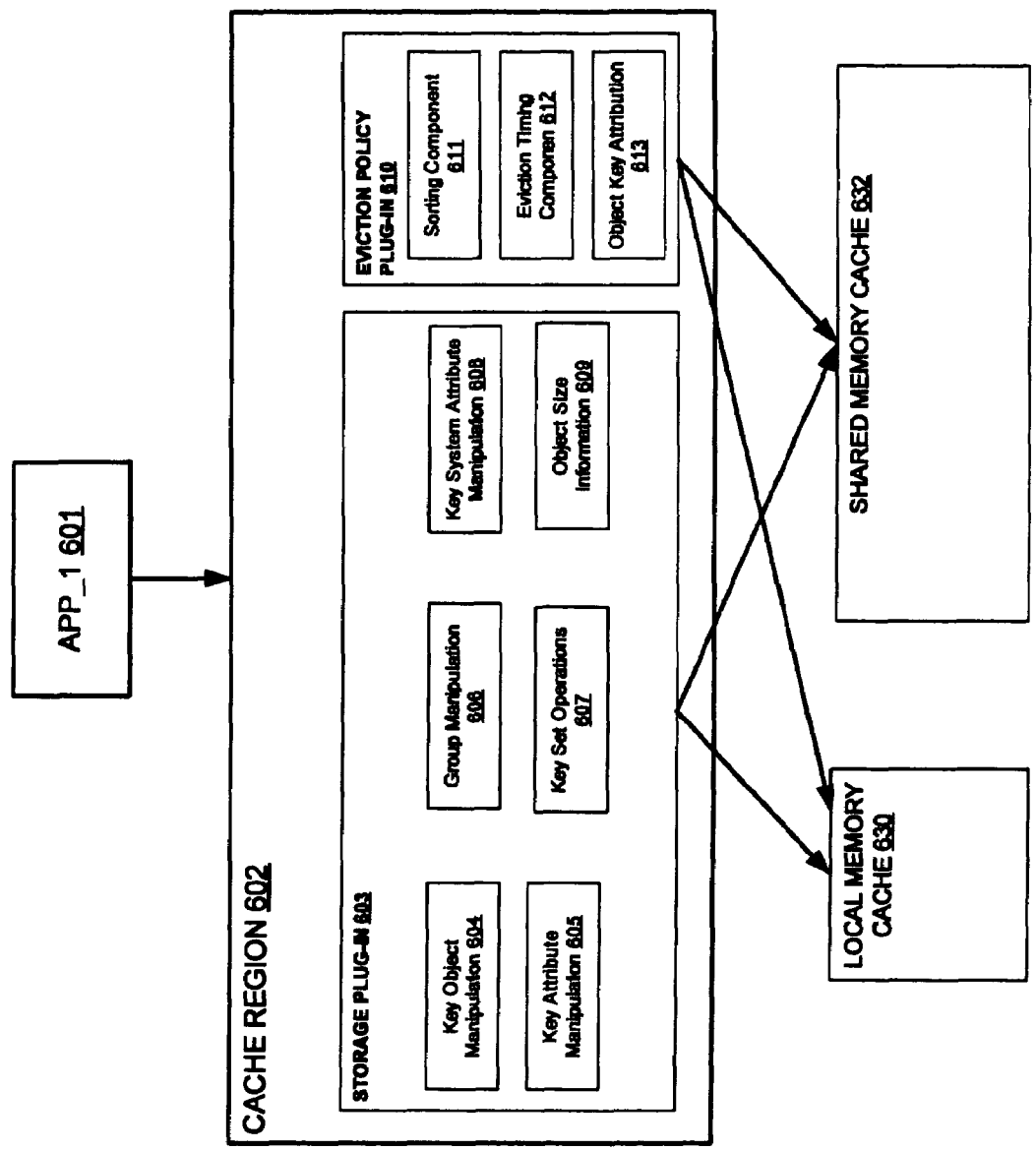

Until now, the storage plug-in for a particular cache region has been generally described as defining the cache storage treatment of one or more objects associated with the cache region. The storage plug-in may be, in one embodiment, the actual piece of software or code that executes various operations (e.g., "get" or "put") for objects stored according to the treatment determined by the associated cache region. FIG. 9 illustrates a more detailed perspective of a possible implementation for a single cache region 602. Recall that multiple cache regions may be established for a single application. Cache region 602 is shown having storage plug-in 603 and eviction policy plug-in 610.

Storage plug-in 603, in one embodiment, is logically represented as being capable of performing several functions, including Key Object Manipulation 604, Key Attribute Manipulation 605, Group Manipulation 606, Key Set Operations 607, Key System Attribute Manipulation 608, and Object Size Information 609. Several functionalities are also associated with eviction policy plug-in 610. These functionalities include Sorting 611, Eviction Timing 612, and Object Key Attribution 613. The various functionalities of eviction policy plug-in 610, which also define a treatment of objects in local memory cache 630 and shared memory cache 632, are described in greater detail further below with respect to FIGS. 13a,b-15. One, all, or a combination of these functionalities may be associated with each object that is handled according to the treatment defined by cache region 602. Again, exemplary discussing is provided in the context of a single object. But, it should be understood that at least with respect to the treatment of objects cached in shared memory, such objects may also be in the form of a shared closure.

Key Object Manipulation 604 is a storage plug-in function that relates to the "get" and "put" operations for an object. For example, a "get" operation retrieves a particular object from local cache memory 630 and/or shared memory cache 632 depending on the "flavor" of the plug-in (consistent with the different caching flavors described in the preceding section). A "put" operation places a copy of an object into local memory cache 630 and/or shared memory cache 632 (again, consistent with the specific "flavor" of the plug-in). For each object associated with a cache region, an object name may be assigned to each object. In turn, each object name may correspond to a unique key value. One embodiment of this organizational structure is illustrated in FIG. 10.

Figure 10:
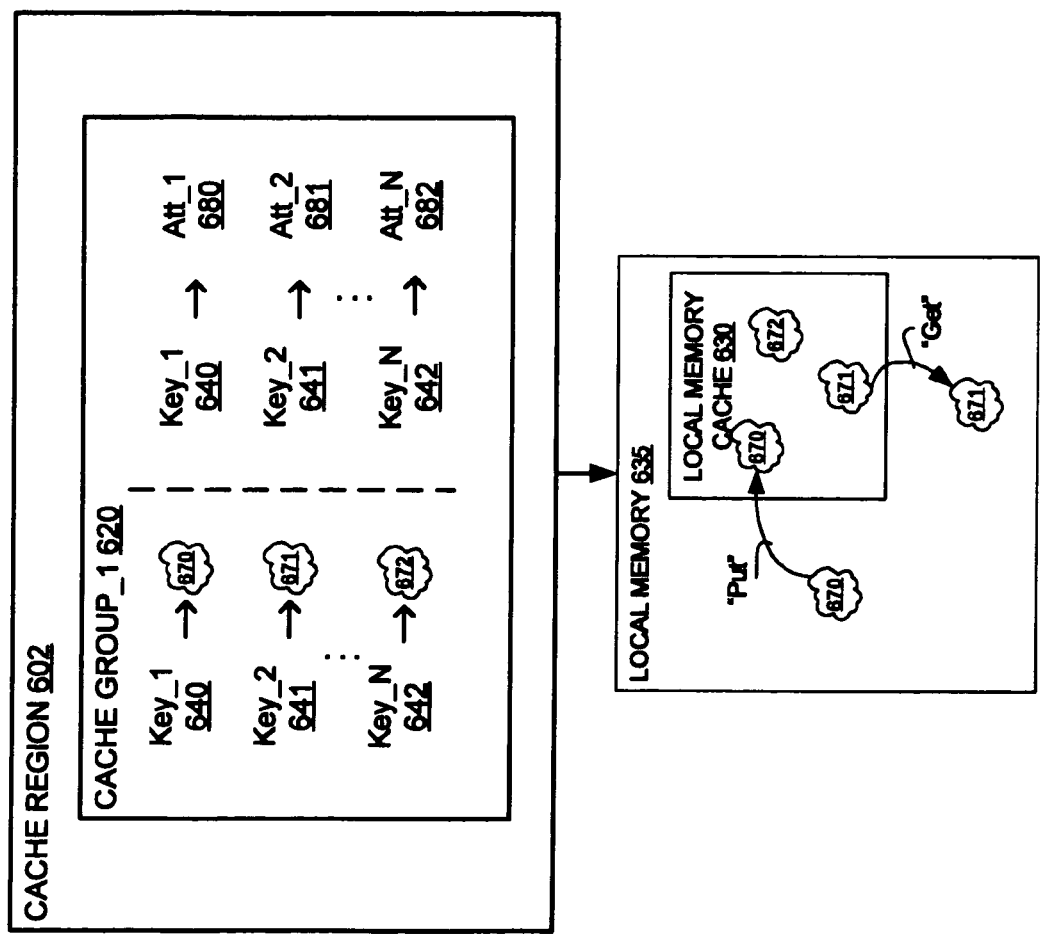
FIG. 10 illustrates one embodiment of an organization structure of a cache region.

Referring to FIG. 10, cache region 602 includes a cache group_1 620 associated with N objects 670, 671, . . . 672. It is important to point out that multiple groups of objects (or "object groups") may be established per cache region (e.g., FIG. 10 only shows one group but multiple such groups may exist in cache region 602). As will be described in more detail below, assignment of objects into a group allows for "massive" operations in which, through a single command from the application, an operation is performed with every object in the group.

Each object of cache group_1 620 is associated with a unique key. That is, for example, Key_1 640 is associated with object 670, key_2 641 is associated with object 671, and key_N is associated with object 672. Each key is a value (e.g., alphanumeric) that, for instance, in one embodiment, is the name of the object. In an embodiment, the key for an object undergoes a hashing function in order to identify the numerical address in cache memory where the object is located.

As such, the Key Object Manipulation functionality 604 of storage plug-in 603 utilizes the key associated with an object to carry out "put" and "get" operations on that object. For simplicity, only a local memory cache 635 is considered (e.g., the storage plug-in may be a "local" or "soft local" flavor).

As an example, object 670 may have the key "Adam" in simple text form. An application (e.g., application_1 601 of FIG. 9) provides the input for a "put" operation of object 670 which may take the form of [PUT, ADAM] in cache. The key, "Adam," undergoes a hashing function by storage plug-in 603 to generate the cache address where object 670 is to be stored. The key object manipulation "put" functionality of storage plug-in 603 completes the "put" operation by writing object 670 to local memory cache 630 at the address described provided by the hashing function.

A feature of the Key Object Manipulation 604 functionality is that an application does not need to know the exact location of a desired object. The application merely needs to reference an object by its key only and the Key Object Manipulation 604 functionality of the storage plug-in is able to actually put the object with that key into the local memory cache 630.

A "get" operation may be performed by the Key Object Manipulation 604 functionality in a similar manner. For example, object 671 may have the name "Bob." An application (e.g., application_1 601 of FIG. 9) provides the input for the "get" operation of object 671 which may take the form of, [GET BOB] from cache. The key, "Bob," undergoes a hashing function by storage plug-in 603 to determine the numerical address where object 671 is stored in local memory cache 630. The Key Object Manipulation 604 functionality of storage plug-in 603 completes the "get" operation by copying or removing object 671 to some other location in local memory 635 outside the cache.

Key Attribute Manipulation 605 is a functionality that relates to defining or changing particular attributes associated with an object. Here, each object has its own associated set of "attributes" that, in one embodiment, are stored in cache address locations other than that of the object itself. Attributes are characteristics of the object's character and are often used for imposing appropriate treatment upon the object. Examples of attributes include shareable/non-shareable and time-to-live (an amount of time an object is allowed to stay in a cache region before being evicted). As each cached object is associated with a key, an object's attributes may also be associated with the key.

Thus, as depicted in FIG. 10, Key_1 640, which is the key for object 670, is also associated with the collection of attributes_1 680 for object 670. Key_2 641, which is the key for object 671, is also associated with the collection of attributes_2 681 for object 671. Note that the attributes 680-682 are also stored in local memory cache 630 (but are not drawn in FIG. 10 for illustrative simplicity). As will be described in more detail below, in an embodiment, the key Attribute Manipulation function 605 performs a first hashing function on the key to locate the collection of attributes for the object in cache; and, performs a second hashing function on a specific type of attribute provided by the application to identify the specific object attribute that is to be manipulated (e.g., written to or read).

The Key System Attribute Manipulation 608 allows for system attributes (e.g., system level parameters) to be keyed and manipulated, and, operates similarly to the key attribute manipulation 605.

Group Manipulation 606 is a storage plug-in functionality that allows for "put" or "get" manipulation of all the objects within a particular group. By specifying the group name for a group of objects, the application may retrieve ("get") all the objects within that group. In an embodiment, the keys for a particular group are registered with the storage plug-in 603. As such, a group name that is supplied by the application is "effectively" converted into all the keys of the objects in the group by the storage plug-in 603. For example, application_1 601 may run a "get" operation for cache group_1 620. By using the name of cache group_1 620 as the input, each of keys key_1 640, key_2 641, . . . key_N 642 are used by the storage plug in cache of keys to perform a "get" operation.

Figure 11:
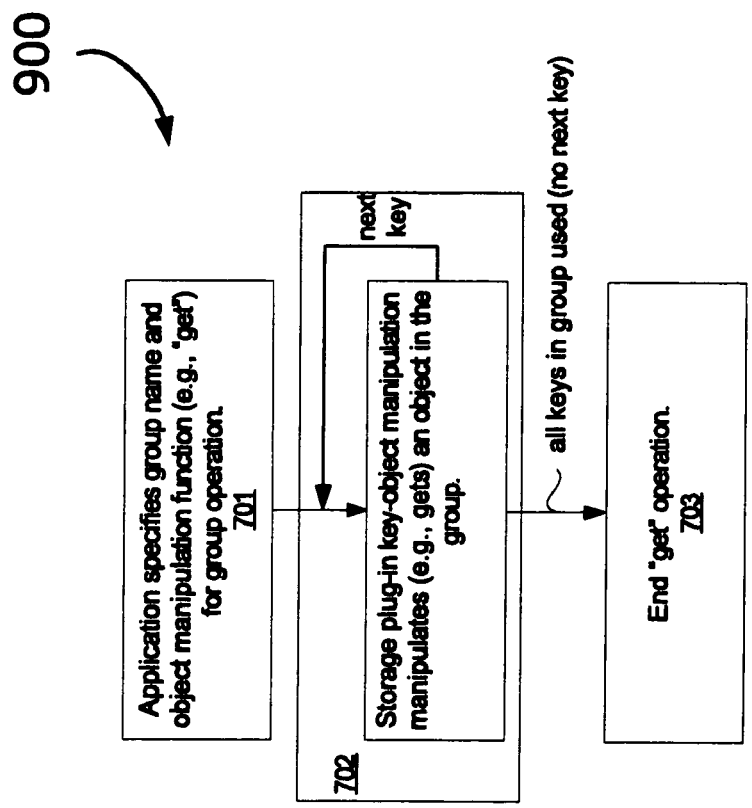
FIG. 11 illustrates a block diagram of one embodiment of a "get" operation using the Group Manipulation functionality.

FIG. 11 illustrates a block diagram 900 of one embodiment of a "get" operation using Group Manipulation 606 functionality and is described in association with FIG. 9 and FIG. 10. This functionality is particularly useful in scenarios involving "massive" operations in which all objects from a particular group are to be affected. Application_1 601 first specifies 701 the group name (e.g., the name of cache group_1 620) needed for the operation and the "get" operation itself. In response, the Group Manipulation 606 functionality of the storage plug-in 603 retrieves 702 all the objects in the group by using the key for the object the group. The "get" operation ends 703 when there are no more keys to use.

The Object Size Information function 609 causes the storage plug-in 603 to calculate the size of an object (e.g., in bytes). Here, the application supplies the key of the object whose size is to be calculated and specifies the object size information function 609. Combined with a Group Manipulation function, the Object Size Information function 609 enables storage plug-in 603 to calculate the size of an entire group. The Key Set Operations function 607 is used to perform specific operations with the keys themselves (e.g., return to the application all key values in a group specified by the application).

As discussed above, each object may have a collection of attributes (e.g., shareable/non-shareable, time-to-live, etc.). In one embodiment, these attributes may be organized in local memory cache to be accessed by an application in a manner similar to the retrieving of an object with a "get" operation described above with respect to the Key Object Manipulation 604 function. In one embodiment, a series of hashing operations may be performed to retrieve one or attributes of a particular object.

Figure 12:
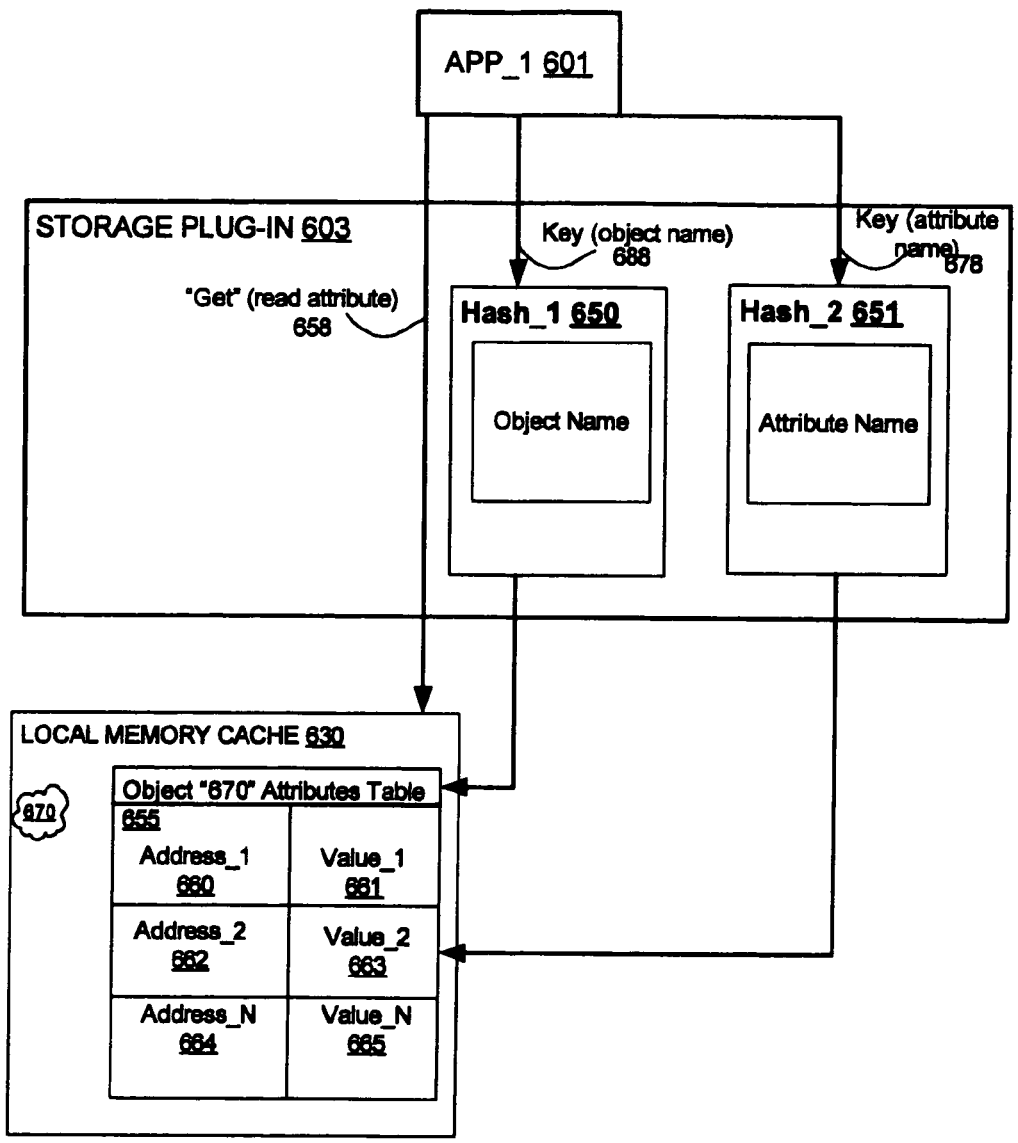
FIG. 12 illustrates a detailed perspective of retrieving an attribute associated with a particular object.

FIG. 12 illustrates a more detailed perspective of an approach for accessing an attribute associated with a particular object. As an extension of the example provided above for object 670 (the get operation for the "Adam" object), FIG. 12 illustrates an attributes table 655 for object 670 organized in local memory cache 630. In one embodiment, attributes table 655 may be within a region of local memory cache in which a specific address value (e.g., address_1 660, address_2 662, . . . address_N 664) is associated with a specific attribute value (e.g., value_1 661, value_2, 663, . . . value_N 665).

A "get" operation for a particular attribute of an object may be carried out in the following manner. Application_1 601 specifies: 1) the operation 658 (e.g., "get"); 2) the key for the object 668 (e.g., "ADAM"); and, 3) the applicable attribute 678 (e.g., "SHAREABLE/NON-SHAREABLE"). As discussed above with respect to FIG. 10, a collection of attributes (e.g., attributes table 655) may be associated with a particular object. In the approach of FIG. 12, the table 655 for a particular object 670 is made accessible with the object's key. For example, as illustrated in FIG. 12, the key 688 ("Adam") for object 670 undergoes a first hashing function (e.g., hash_1 650), that, in consideration of the operation pertaining to an attribute, causes the numerical address in local memory cache 630 where attributes table 655 is located to be identified.

A second hashing function (e.g., hash_2 651) is performed using the desired attribute 678 (e.g., SHAREABLE/NON-SHAREABLE) as the key. The hash_2 651 hashing function identifies the particular numerical address of the particular attribute of attributes table 655 that is to be accessed. For example, if the Shareable/Non-shareable attribute value corresponds to value_2 663, the alphanumeric "name" of the attribute (e.g., "Shareable/Non-shareable") would map to address_2 662 of attributes table 655.

Eviction Policy Programming Models

Caches, either local or shared, have limited storage capacities. As such, a cache may require a procedure to remove lesser used objects in order, for example, to add new objects to the cache. Similar to a storage plug-in being designed to impose certain storage treatment(s) on an object, the eviction policy plug-in provides various functionalities for the active removal of an object from cache. As briefly discussed above with respect to FIG. 9, and as again provided in FIG. 13A, eviction policy plug-in 610 is logically represented as being cable of performing several functions, including object sorting 611, eviction timing 612, and object key attribution 613.

Figure 13A:
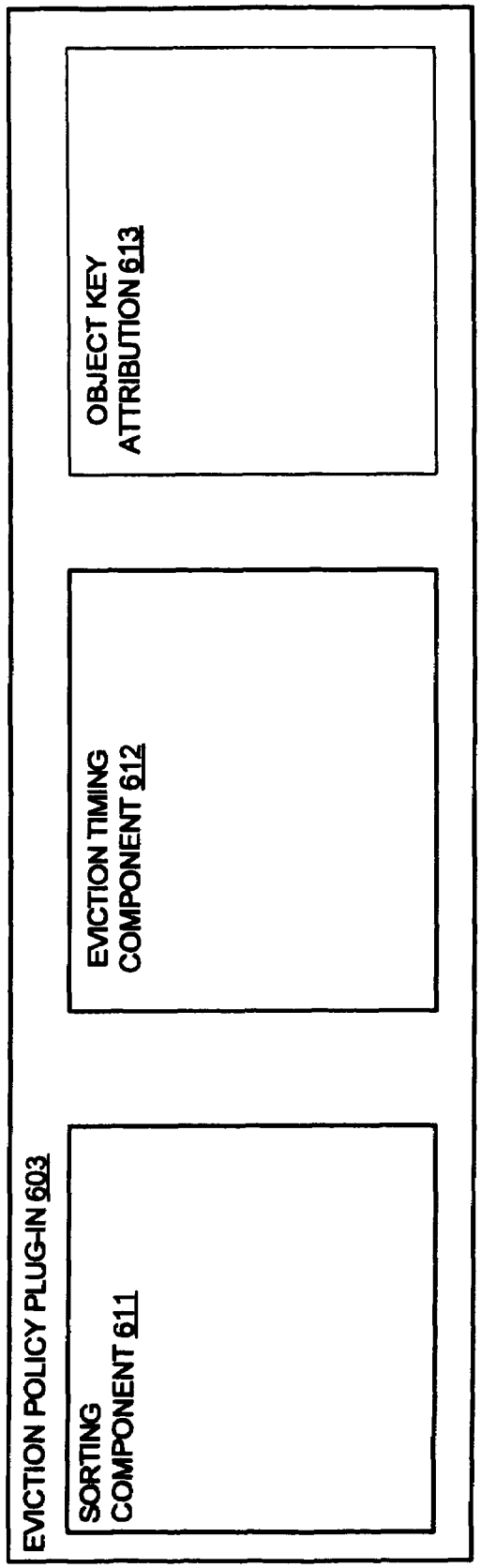

Referring to FIG. 13A, sorting component 611 is type of a queuing function that effectively sorts objects stored in a cache region so that a cached object that is most appropriate for eviction can be identified. Different sorting component types that each enforces a different sorting technique may be chosen from to instantiate a particular eviction policy with plug-in 606. That is, in one embodiment, there are different "flavors" of object sorting that may be selected from, and, one of these may be used to impose treatment on, for instance, an entire cache region. In other embodiments, multiple object sorting components (conceivably of different flavors) may be established per cache region (e.g., one mutation notification per cache group).

To the extent the sorting component 611 can be viewed as a component that chooses "what" object should be removed from cache, the eviction timing component 612 is a component that determines "when" an object should be removed from cache. Different flavors for eviction timing components may also exist and be chosen from for implementation. Typically, a single eviction timing component is instantiated per cache region; but, conceivably, multiple eviction policy components may be instantiated as well (e.g., one per cache group). The object key attribution 613 component enables the involvement of certain object attributes (e.g., object size) in eviction processes.

For simplicity, the remainder of this detailed description will be written as if an eviction policy plug-in applies to an entire cache region.

Figure 13B:
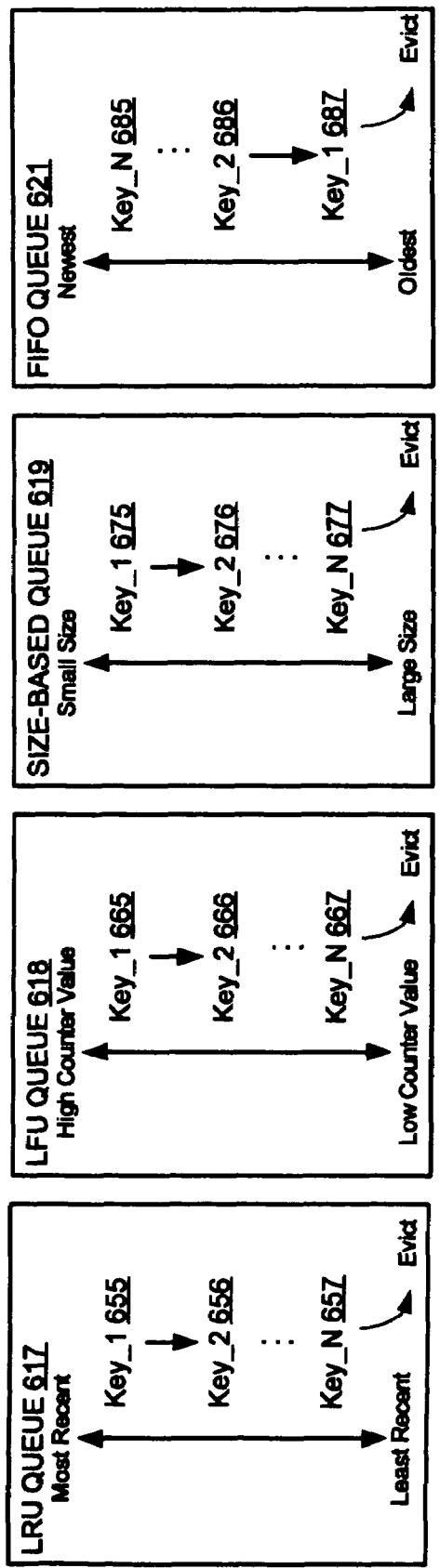

FIG. 13B illustrates a more detailed perspective of various types of sorting components 611 that may be chosen for use within a particular eviction policy plug-in 603. In one embodiment, four types of queues may be implemented by sorting component 611: 1) a Least Recently Used (LRU) queue 617; 2) a Least Frequently Used (LFU) queue 618; 3) a size-based queue 619; and, 4) a First In First Out (FIFO) queue 621. In one embodiment, the different types of sorting techniques queue the keys associated with the cache region's cached objects. The identification of a key that is eligible for eviction results in the key's corresponding object being identified for eviction. In the case of shared closures, various approaches are possible. According to a first approach, sorting is performed at the object level, that is, keys are effectively sorted where each key represents an object; and, if a particular object identified for eviction happens to be a member of a shared closure that is cached in shared memory cache, the entire shared closure is evicted from shared memory cache (e.g., with a "delete" operation). According to a second approach, if an object is a member of a shared closure, a key for the shared closure as a whole is sorted amongst other keys. In either case, identifying a "key" that is eligible for eviction results in the identifying of an object for eviction (where, in the case of shared closure, an object and all its shared closure member objects are identified for eviction).

According to the design of the LRU queue 617, objects cached in a cache region that are accessed least recently (e.g., through either a "get" or "put" operation) are discarded first. LRU queue 617 is represented with a vertical ordering structure for multiple keys (e.g., key_1 655, key_2 656, . . . key_N 657). Essentially, the top of the queue represents keys for objects that have been used most recently, and, the bottom of the queue represents keys for objects that have been used least recently. According to one implementation of LRU queue 617, the object corresponding to the key at the very bottom would be next evicted. Removal of a key from the bottom of the queue triggers the eviction of that key's corresponding object from cache.

Here, any time an object is accessed (e.g., by way of a "get" or "put" operation), the key corresponding to that object is positioned at the very top of LRU queue 617. As illustrated by the position of key_1 655, the object associated with key_1 655 is the most recently accessed object. If, however, in a following operation an application (e.g., application_1 601) accesses the object associated with key_2 656, then, key_2 656 would be repositioned above key_1 655 in the LRU queue 617.

At any given instant of time, the key whose object has spent the longest amount of time in the cache region without being accessed will reside at the bottom of the queue. As such, when the moment arises to remove an object from the cache region, the object whose key resides at the bottom of the queue will be selected for removal from the cache region.

LFU queue 618 is an eviction policy in which cached objects accessed least frequently (e.g., through either a "get" or "put" operation), based on a counter, are discarded first. Each key for an object may have an associated counter that measures or keeps track of the number of times the object is accessed (e.g., the counter for the object's key is incremented each time the object is accessed). In one embodiment, the counter value may be an "attribute" for the object as described previously.

As with LRU queue 617, LFU queue 618 is represented with a vertical ordering structure for multiple keys (e.g., key_1 665, key_2 666, . . . key_N 667). The top of the queue represents keys for objects that have the highest counter value, and the bottom of the queue represents keys for objects with the lowest counter value. Here, over the course of time, those keys whose corresponding objects are accessed more frequently than other cached objects will be "buoyant" and reside near the top of the queue; while, those keys whose corresponding objects are accessed less frequently than the other objects in the cache region will "sink" toward the bottom of the queue.

At any instant of time, the key whose corresponding object has been used less than any other object in the cache region will be at the bottom of the queue. Thus, according to one implementation of LFU queue 618, the object corresponding to the key at the very bottom would be next evicted, because that object has the lowest counter value (e.g., lowest frequency of use). Removal of the key from the bottom of the queue triggers the eviction of that key's corresponding object from the cache region. Note that the counters for all the keys may be reset periodically or with each entry of a newly cached object in order to ensure that all the counter values can be used as a comparative measurement of use.

Size-based queue 619 is an eviction policy in which cached objects are prioritized according to size (e.g., the number of total bytes for the object). As such, object size may be another object attribute. The keys for objects in size-based queue 619 are shown arranged vertically with the smallest objects positioned near the top of the queue and keys for the largest objects positioned near the bottom of the queue. According to one implementation of size-based queue 619, the object corresponding to the key at the very bottom would be evicted first, because that object consumes the most amount of cache region space, and its subsequent removal would result in the most amount of free cache region space recovered (amongst all the objects that are cached in the cache region).

FIFO queue 621 is an eviction policy in which cached objects are removed according to the order that they are placed in the cache relative to one another. In one embodiment, when an eviction moment arises, the first cached object eligible for eviction corresponds to the object that has spend the most time in the cache, followed by the next oldest object, and so on. FIFO queue 621, illustrated in FIG. 13*b*, is also depicted with a vertical ordering structure for key_1 655, key_2 656, . . . key_N 657, with key_1 655 corresponding to the oldest object (e.g., the first object placed in the cache) and key_N 677 corresponding to the newest object (e.g., the most recent object placed in the cache). When an eviction process is triggered, the object for key_1 675 would be the first for removal. Unlike the other types of queues described above (assuming the size of an object can change in respect of size-based queue 619), there is no possibility for any rearrangement of the key order in FIFO queue 621. The keys are maintained in the order they are added to the cache, regardless of frequency, counter value, or size.

Figure 14:
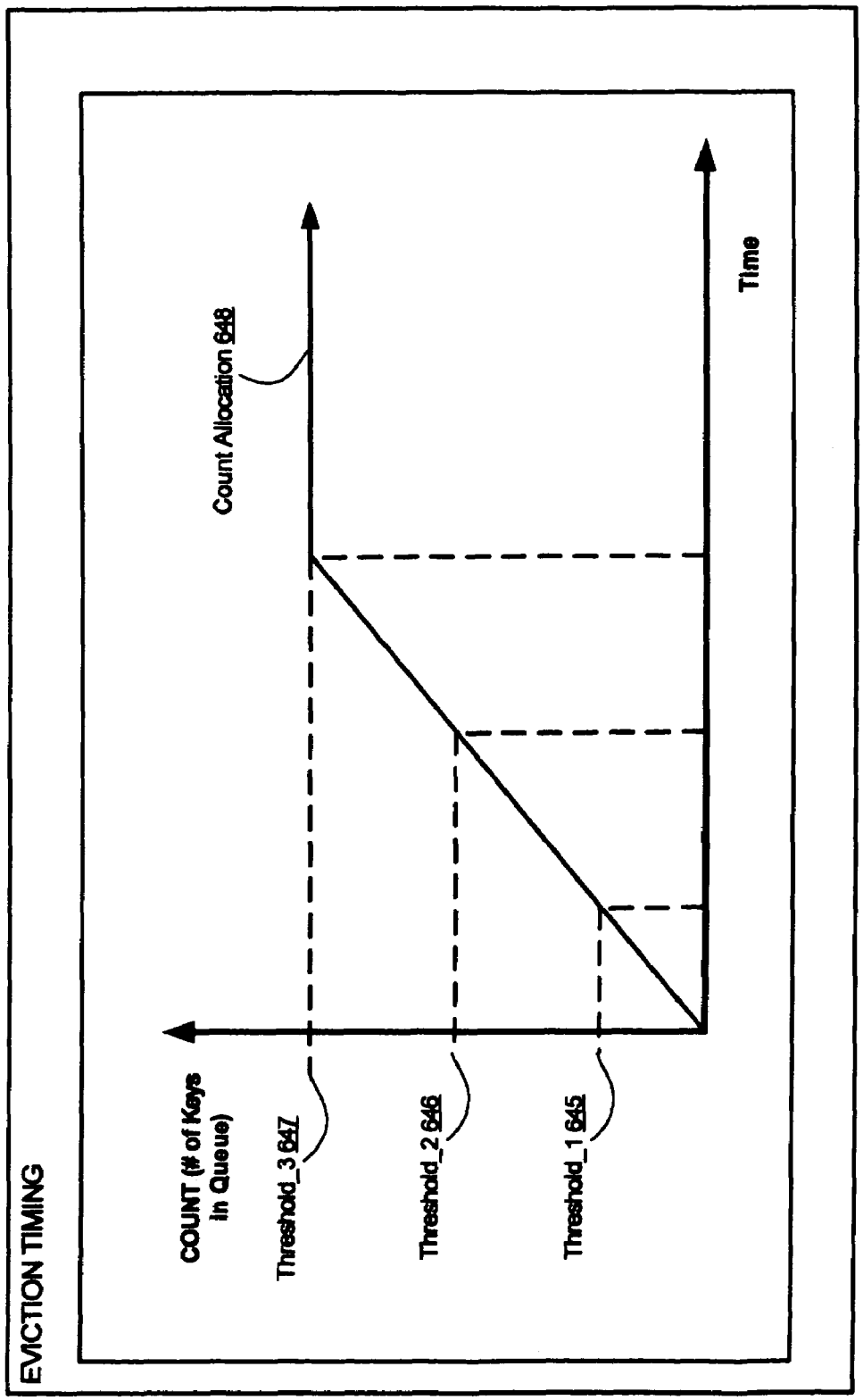
FIG. 14 illustrates a detailed graph of one type of Eviction timing component functionality.

Referring back to FIG. 13A, the eviction timing component 612 is a functionality that determines when an object should be removed from a cache region. FIG. 14 illustrates a detailed graph of one type of eviction timing approach. The vertical axis represents the total number of objects in the cache as represented by the total number of keys in the queue associated with the applicable object sorting approach. The horizontal axis represents time (e.g., in milliseconds). Count allocation 648 represents the "targeted" maximum number of keys in the queue, which, in turn, corresponds to the targeted maximum number of allowable objects in the cache region.

In one embodiment, three threshold levels may be established for the cache region. A first threshold level, threshold_1 645, corresponds to a level at which the eviction of a key from the sorting queue occurs on a timely basis. For example, when the count exceeds threshold_1 645 (but not threshold_2 646), a key is evicted from the sorting queue every millisecond until the total count falls below threshold_1 645. In one embodiment, no active eviction occurs for count levels below threshold_1 645.

A second threshold level, threshold_2 646, corresponds to a level above which eviction of a key occurs on each entry into the cache of a newly cached object. That is, with each new addition of an object into cache, the key at the bottom of the applicable sorting queue is removed from the queue resulting in its corresponding object's eviction from cache. With this approach, the population of the cache region should remain constant in the absence of objects being removed from the cache region by processes other than eviction (such as deletion and/or garbage collection and/or attribute based as described below with respect to Object Key Attribution). With processes other than eviction, the cache region population may fall below threshold_2 646 after the threshold has been crossed.

A third threshold level, threshold_3 647, corresponds to a level equal to the targeted maximum allocation 648 for the cache region. When this level is exceeded, keys are evicted from the sorting queue until, in one embodiment, the total count of keys decreases to threshold_3 647 (or just beneath threshold_3 647). Note that this approach contemplates the population of the cache region exceeding its "targeted" maximum allocation for some reason.

Figure 15:
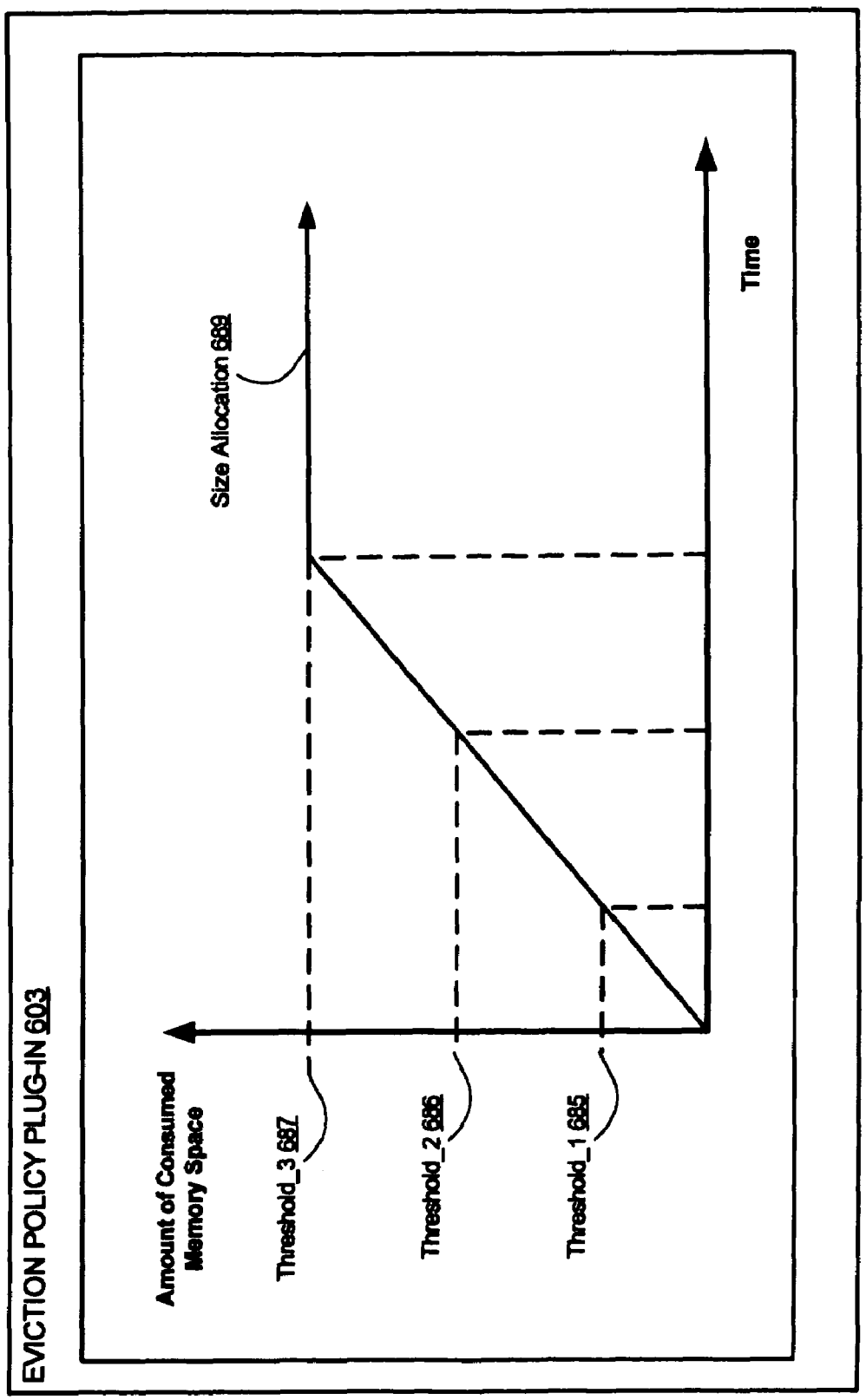
FIG. 15 illustrates a detailed graph of another type of Eviction timing component functionality.

Either of the eviction timing techniques may be used with the LRU 617 LFU 618 or FIFO 619 sorting technique. FIG. 15, by contrast, illustrates a detailed graph of another type of eviction timing technique that is to be used with the size based 619 sorting technique. In this embodiment, the vertical axis represents the total amount of consumed memory space of the cache. The horizontal axis represents time (e.g., in milliseconds). Size allocation 689 represents the maximum "targeted" allocated memory capacity of the cache region in terms of size (e.g., bytes).

In one embodiment, threshold_1 685, threshold_2 686, and threshold_3 687 have similar properties with threshold_1 645, threshold_2 646, and threshold_3 647, respectively. The only difference is that the memory consumption of the cache region (through the caching of its cached objects) triggers the crossing of the various thresholds.

Referring again back to FIG. 13A, Object Key Attribution 613 is a functionality that allows for the eviction of objects based on specific attributes that may be user-defined, system-defined, or otherwise customizable. For example, objects may be evicted on a Time-To-Live (TTL) basis in which case an object's key is pulled from the sorting queue (regardless of where it is located within the queue) if the object resides in the cache region for more than an amount of time set by the TTL attribute. Another attribute based eviction policy is Absolute Eviction Time (AET). In the case of AET, an actual time is set (e.g., 12:00 AM). If the object resides in the cache region after this time the object is evicted from the cache region.

Also, in the case of size based eviction policies, each objects size may be found in its attribute table.

Cache Management Library

Figure 16:
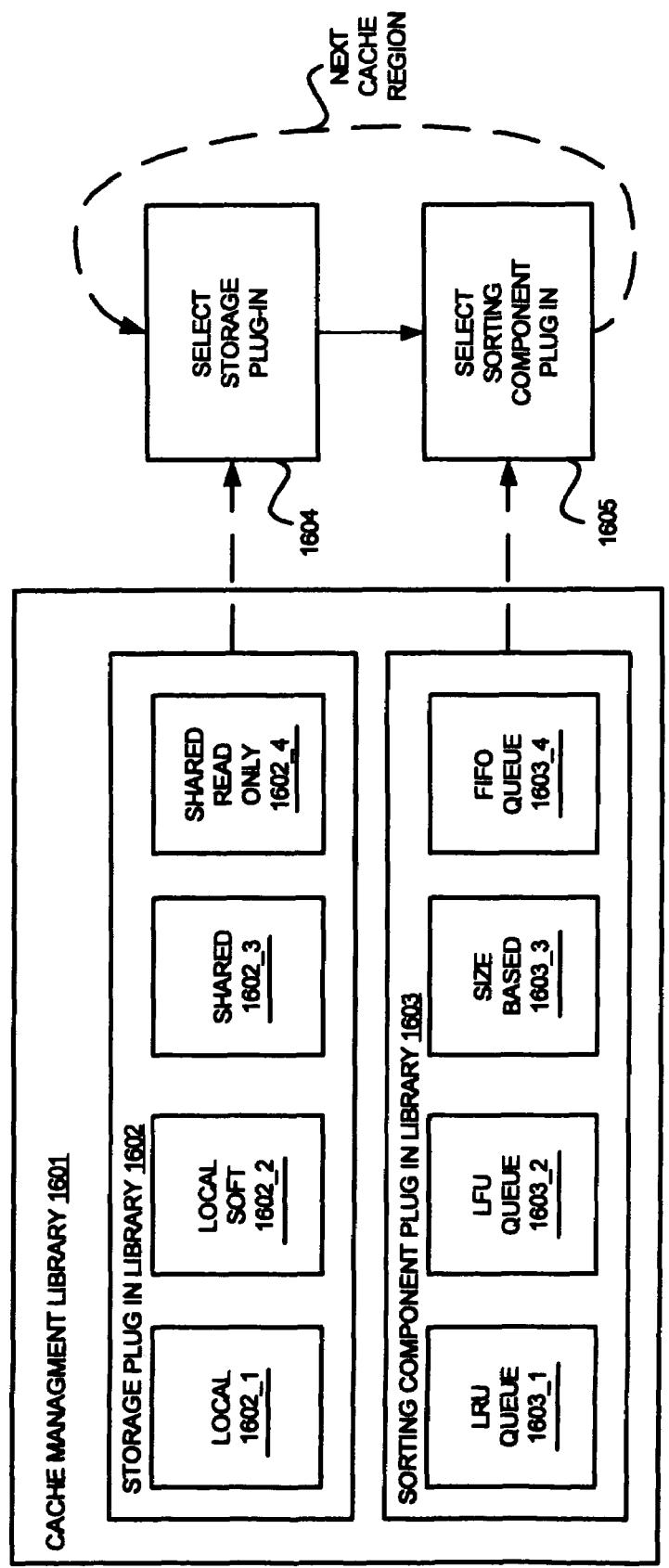
FIG. 16 shows a depiction of a cache region definition building process.

The preceding discussions revealed that, referring to FIG. 16, a cache management library 1601 containing various plug-ins may be used to help build cache regions that impose various forms of object/shared closure treatment. Specifically, the Local, Local Soft, Shared and Shared Read Only storage plug-ins 1602_1, 1602_2, 1602_3, 1602_4 may be part of a collective storage plug in library 1602; and, the LRU, LFU, Size Based and FIFO sorting plug-in components 1603_1, 1603_2, 1603_3, 1603_4 may be part of a collective sorting plug-in component library 1601.

Here, definition of a specific cache region is effected by selecting 1604 a storage plug-in from the storage plug-in part 1602 of the cache management library 1601 and by selecting 1605 a sorting component plug-in from the sorting component plug-in part 1603 of the cache management library 1601. For each new cache region to be implemented, another iteration of the selection processes 1604, 1605 is performed. Thus, if a single application were to establish multiple cache regions, the configuration for the application would entail running through selection processes 1604, 1605 for each cache region to be implemented.

Distributed Cache Architecture

As discussed above with respect to FIG. 4, a storage policy plug-in of a cache region may dictate that an object stored in the local and/or shared cache memory be copied into deeper storage space 440 (e.g., a persisted database, in response to an object's removal from the cache). In one embodiment, the storage of a particular object into deeper storage allows for the "sharing" of that object on a much larger scale (e.g., between different computing systems or application servers). For example, an object commonly used by a cluster of application servers may be written to a persisted database for retrieval by any physical machine.

In another example, a first computing system having a first virtual machine may crash during the course of running operations with a number of objects. If the objects are stored in a persisted database, a second virtual machine from a second computing system may be able to restore the operations that were running on the first computing system, using the same objects retrieved from the persisted database.

Figure 17:
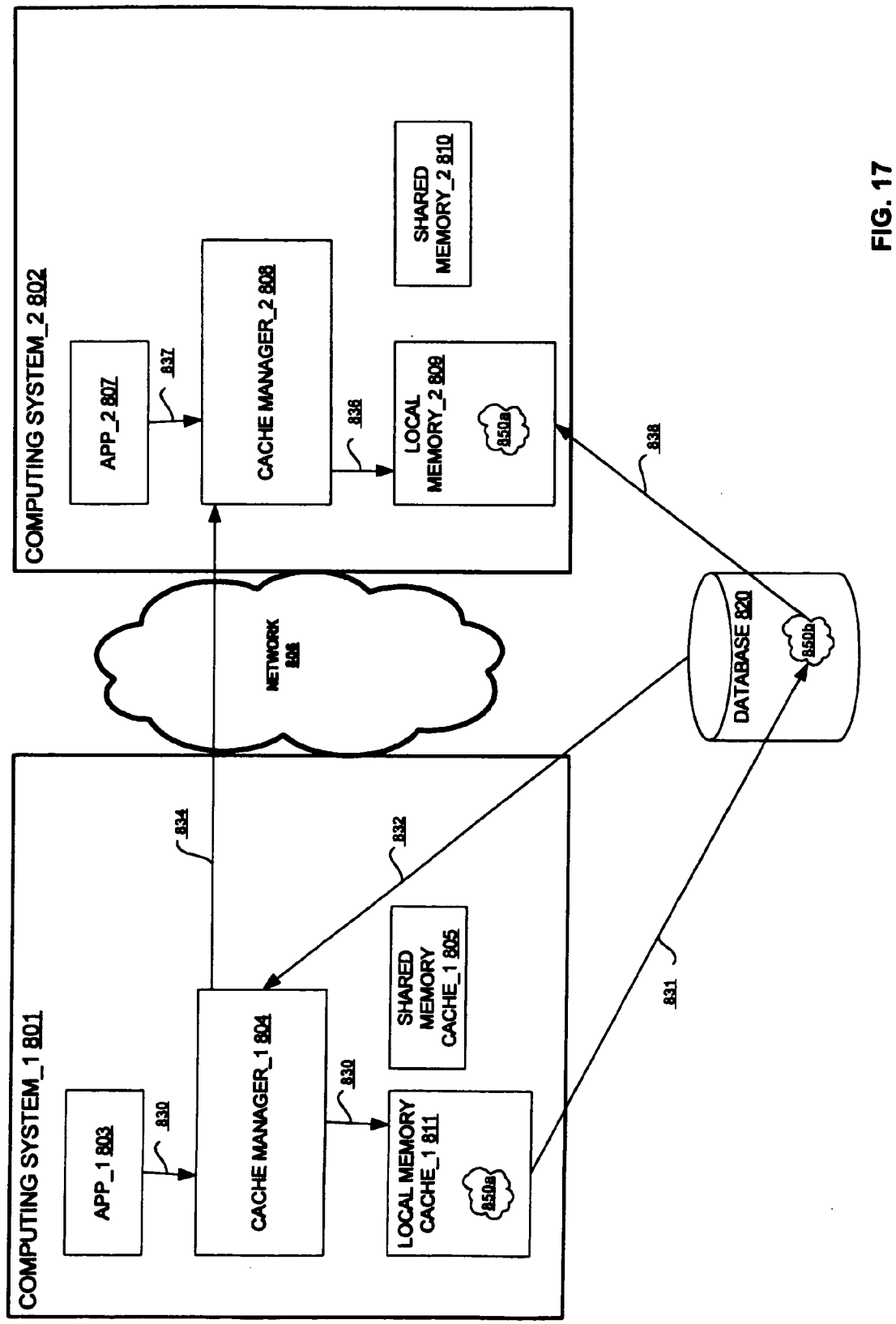
FIG. 17 illustrates a detailed perspective of one embodiment of a distributed cache architecture.
Figure 18:
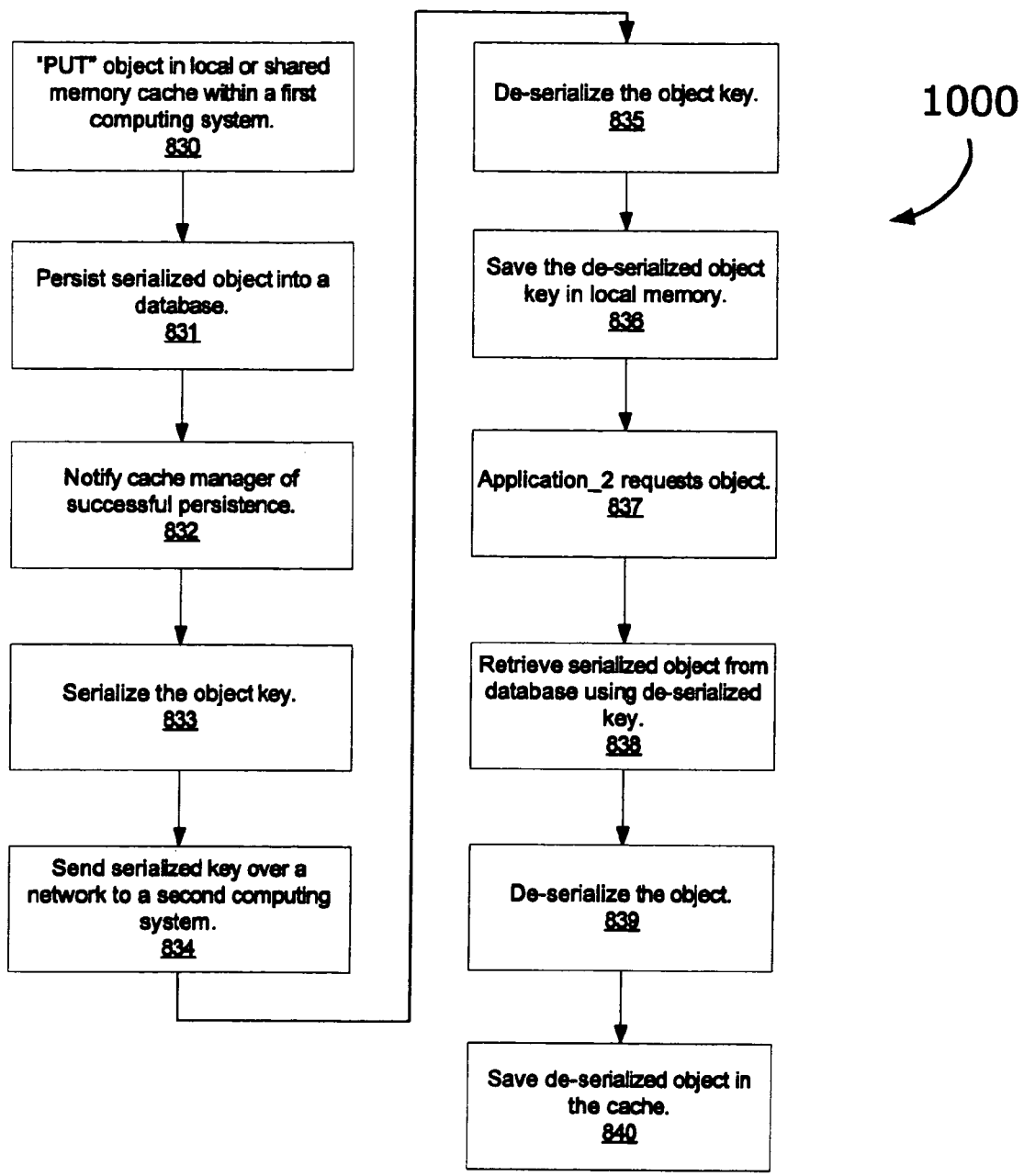
FIG. 18 illustrates a block diagram of one method of sharing an object between different computing systems.

FIG. 17 and block diagram 1000 of FIG. 18, taken together, illustrate one method of preserving an object's cached status between two computing systems. Application_1 803, running on computing system_1 801, specifies a "PUT" operation 830 for object 850a into local memory cache_1 811 or shared memory cache_1 805. In one embodiment, the "PUT" operation may involve the various functionalities of a storage plug-in described above for a cache region by cache manager_1 804. Object 850a is generically represented but in one embodiment object 850a may be a group of objects, and in another embodiment may be objects contained within a shared closure. Object 850a is then persisted 831 in database 820 that is visible to other computing systems, including computing system_2 802.

In one embodiment, a Structured Query Language (SQL), or SQL-like command statement may be used to write a serialized version of object 850b into database 820. (In FIG. 17, the de-serialized object is referenced as 850a, and the serialized object is referenced as 850b). In alternate embodiments, other known database languages may be used to write object 850b into database 820. Upon successful writing of object 850b in database 820, a notification "statement of success" is sent 832 to cache manager_1 804. Along with the success notification statement, the key for object 850b may also be sent to cache manager_1 804, where, according to a further implementation, the key is in a de-serialized form. Object keys have been discussed in detail above with respect to FIGS. 10-12.

Upon receiving the success notification and the de-serialized key for object 850b, cache manager_1 804 serializes 833 the key for object 850b and sends the serialized key 834 across a network 806 to computing system_2 802. Cache manager_2 808 receives the serialized key for object 850b and then de-serializes the key, 835. The de-serialized key may then be registered with a storage plug-in associated with cache manager_2 808.

When application_2 807 running on computing system_2 802 requests 837 object 850b, the de-serialized object key that is registered with cache manager_2 808 is used to retrieve 838 the serialized object 850b from database 820 at computing system_2 802. The serialized object 850b may then be de-serialized 839 by cache manager_2 808. The de-serialized object 850a may then be saved in local memory cache_2 809 and/or shared memory cache_2 810.

Lock Construct

An object may be shared between threads of a single VM, threads of different VMs on the same machine or of the same instance, or threads of different VMs on separate machines. A shared object is any object that may be accessed by more than one thread. For example, a shared object may be located in a shared memory (including shared closures) and/or have a local copy in local memory.

A thread of an application operates on objects accessible to that application. There may be times when one thread of an application is accessing an object when another thread also requires access to the same object. In some cases there are no problems with this occurring. For example, if both threads are simply reading the contents of the object. However, it may be desirable to assure that access to this object is restricted to one thread at a time so that the values of the object are not altered by different threads at the same time thereby rendering unwanted results to at least one of the threads accessing the object. In other words, to prevent so-called "dirty writes" to the object.

Figure 19:
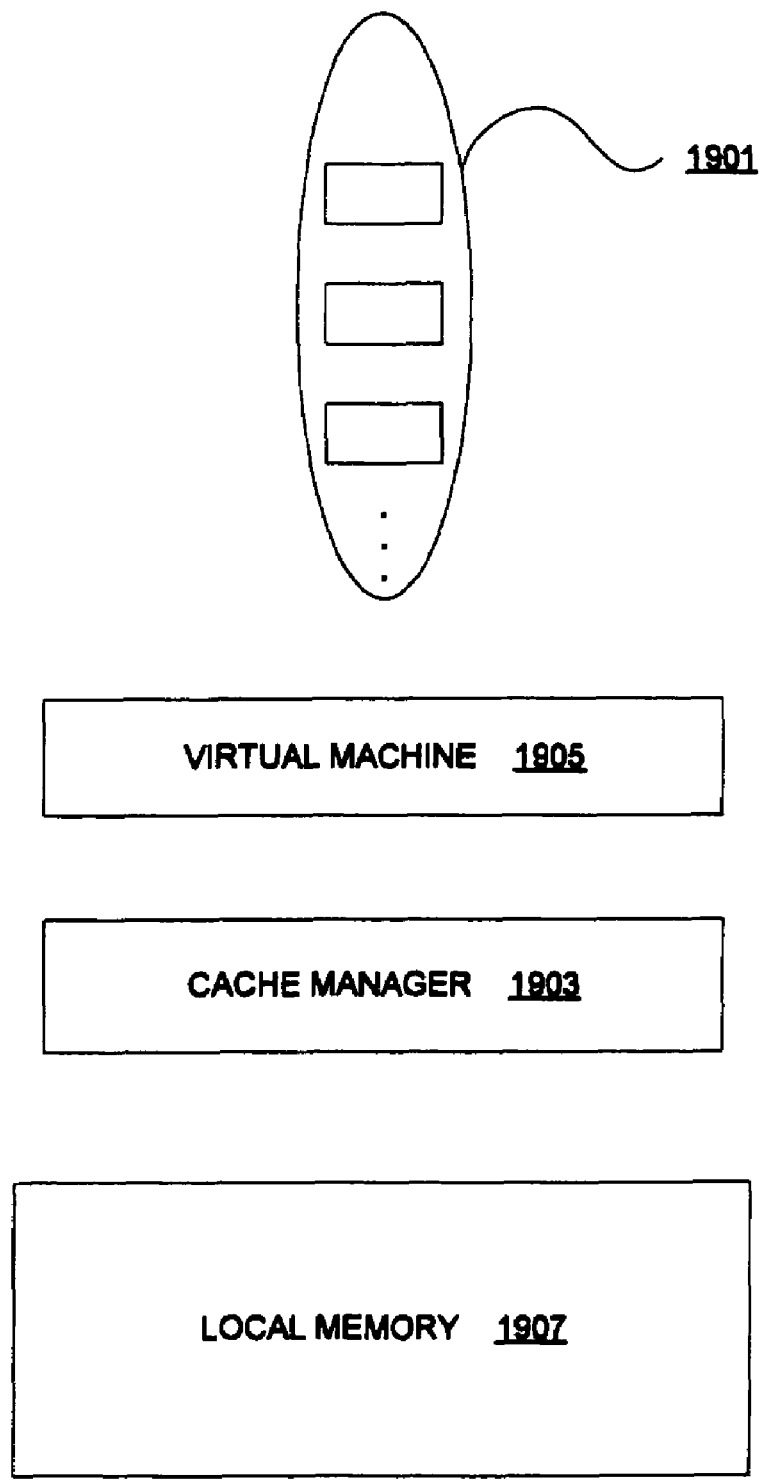
FIG. 19 illustrates a system architecture in accordance with an embodiment of the invention.

FIG. 19 illustrates a system architecture in accordance with an embodiment of the invention. This architecture, a subset of the architecture depicted in FIG. 1, at least includes an application with multiple threads 1901, a cache manager 1903, a virtual machine 1905, and a memory 1907. Exemplary memory includes persistent storage, local storage, shared local storage, and cache.

As the virtual machine 1905 processes the threads of the application 1901 it may be necessary to effectively lock out the other threads from accessing an object in memory 1907 that is shared by more than one thread. As discussed in the background, the Java programming language provides for a lock associated with each object that is used during synchronization. This lock restricts access to the object to only one thread until the lock is released.

However, a shared object may be locked without relying on Java synchronization that has been discussed in the background. In fact, the synchronization techniques (synchronized, wait, and notify statements) inherent within the Java language do not address the problem locking an object when more than one VM is used especially in a shared closure environment. The Java techniques only impact on a local VM. Therefore, another locking mechanism is necessary that enables Java application and infrastructure developers to define a block of operations which is executed in an atomic manner similar to the synchronized statement provided by the Java language, but apply to all Java virtual machines (VMs) on one instance (for example, a application server instance).

In one embodiment, a shared lock class provides a static factory method named getSharedLock(java.lang.String name) that returns an instance of the SharedLock class. This method expects a string parameter as its input, which represents the name to be locked. The factory method does not do any locking. The shared lock instance may be shared between VMs on the same physical machine. That means if more than one VM or more than one VM thread wants to get a shared lock of the same name, they all will get the same shared lock instance. This is because a shared lock instance is a shareable object and that makes it possible to use it in Shared Closures.

As the factory does not lock anything each thread that will access the shared object contains a snippet or block of code that prevents access to that object while another thread has control over the object. This snippet of code will now be referred to as either a shared lock or the shared locking construct.

The shared lock pseudo code of one embodiment is as follows:

```
sharedLock.executeLocked("key", new runnable( )){
    run( ){
        .
        .
        .
        cache.put("key", object);
    };
};
}
```

In the above pseudo code, the lock is implemented by the call "sharedLock.executeLocked." In one embodiment, this snippet of code is an object that only one thread may obtain and execute on as the "sharedLock" is object acquired from the shared domain (for example, cache). This object is acquired by a specific name and thus concurrent threads trying to acquire the sharedLock with the same name will reference the same shared resource. Therefore, the executeLocked (java.lang.Runnable) instance method enables the developer to define a block of operations which is executed in an atomic manner. The java.lang.Runnable interface contains a run( ) method, which has to be implemented by a respective class. This method represents the critical section, which is executed atomically. If several concurrent threads in one or several VMs are executing the executeLocked method, all but one thread will get the lock based on the specified name and the corresponding executeLocked method is performed. The other threads will be blocked until the execution finishes. Then the waiting threads are competing for the lock and the analogous procedure takes place.

In the above code, the run method executes a put operation which uses the key ("key") to determine the location in cache to place the shared object ("object") and places (puts) the shared object in that location. The concept of a key has already been discussed. Each key is a value that, for instance, is the name of the object. The key for an object undergoes a hashing function in order to identify the numerical address in memory where the object is located. Of course, other operations involving the manipulation of the shared object occur before the put function. The lock is released once the run method finishes, allowing other threads to access the shared object. Of course it should be understood that equivalent code snippets may be used with the underlying principles.

Figure 20:
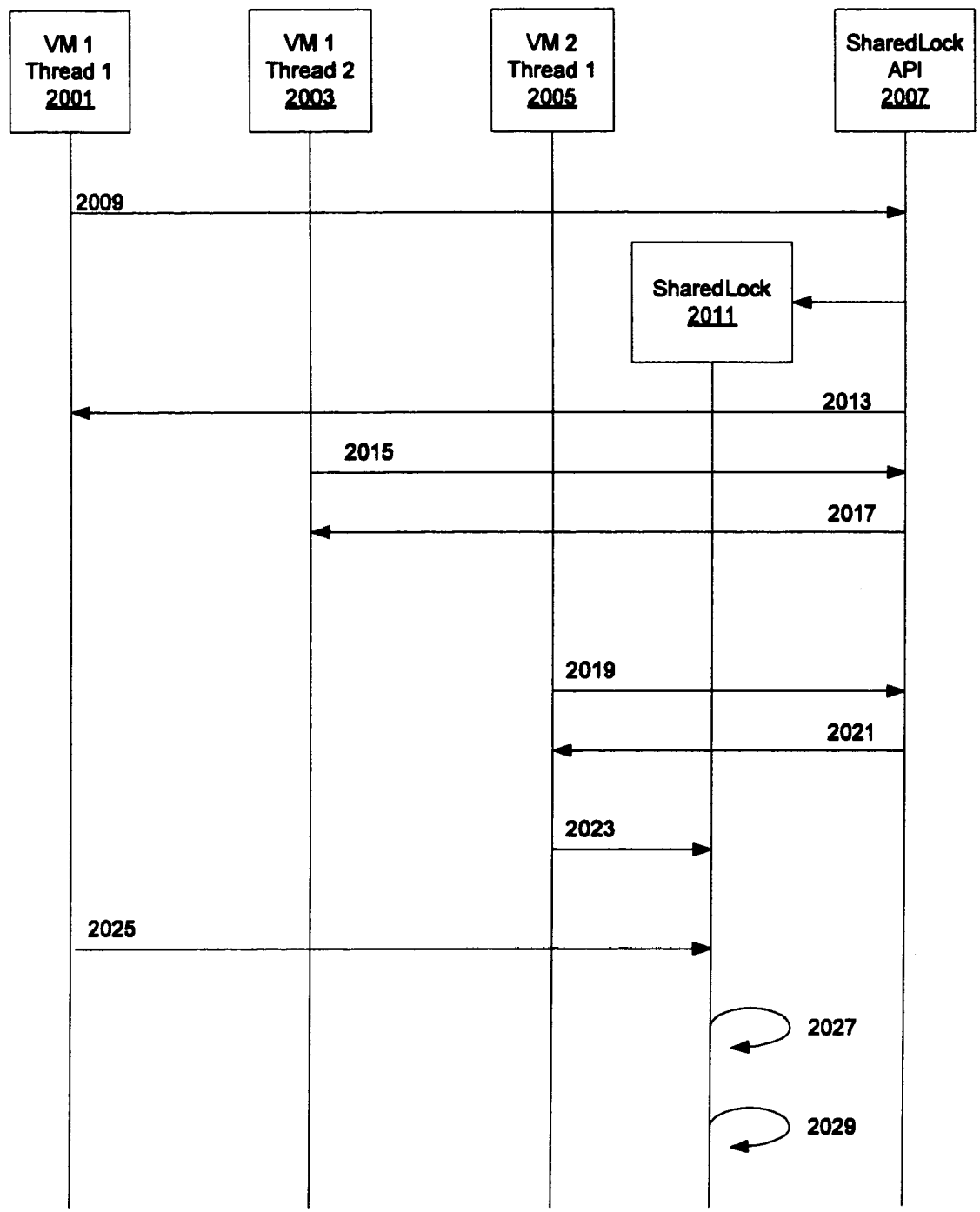
FIG. 20 illustrates an exemplary flow of a shared lock in operation between threads of different virtual machines.

FIG. 20 illustrates an exemplary flow of a shared lock in operation between threads of different VMs. Three threads 2001, 2003, 2005 distributed across two different VMs are competing for a lock named LockTest from the SharedLock API 2007. The first thread 2001 calling at 2009 the SharedLock API 2007 implies the creation of the SharedLock instance 2011 and gets a reference to the instance at 2013. All other threads 2003, 2005 get a reference at 2017, 2021 to the same instance 2011 by calling at 2015, 2019 the API 2007.

After getting the instance Thread 1 in VM 1 2001 and Thread 1 in VM 2 2005 are competing for a mutual exclusive operation indicated by calling the executeLocked( ) method at 2023, 2025 with the corresponding instance of the java.lang.Runnable class. As depicted, Thread 1 in VM 2 2005 wins the race and gets the lock, whereas Thread 1 in VM 1 2001 is blocked and has to wait until the respective lock comes free. Meanwhile, the SharedLock implementation executes the run( ) method on the Runnable object of Thread 1 in VM 2 at 2027. After having finished the execution step, control is passed back to Thread 1 in VM 2. Then Thread 1 in VM 1 gets the lock and the respective run( ) method on the specified runnable object is performed at 2029.

The cache manager 1903 provides the ability to store in various cache regions as described earlier. Of course it should be understood that the principles described above are applicable to configurations that use a shared memory implementation including those with shared closures, for example as in the system as described in FIG. 2. The systems as described in FIGS. 1, 2, and 19 are examples of local systems (e.g., on the same physical machine and in the same instance).

Shared Lock and Message Server

The shared locking construct is applicable to systems that include more than one virtual machine including systems that have virtual machines on different physical machines that are interconnected by a network. In order to ensure that information is shared properly between virtual machines or physical machines a message server may be implemented. Each physical machine has a message server and/or there is a central message server. This message server receives messages from one system and routes them to another system. For example, a message may be sent from a first physical machine that is altering a shared object that other physical machines also access.

Exemplary System

Figure 21:
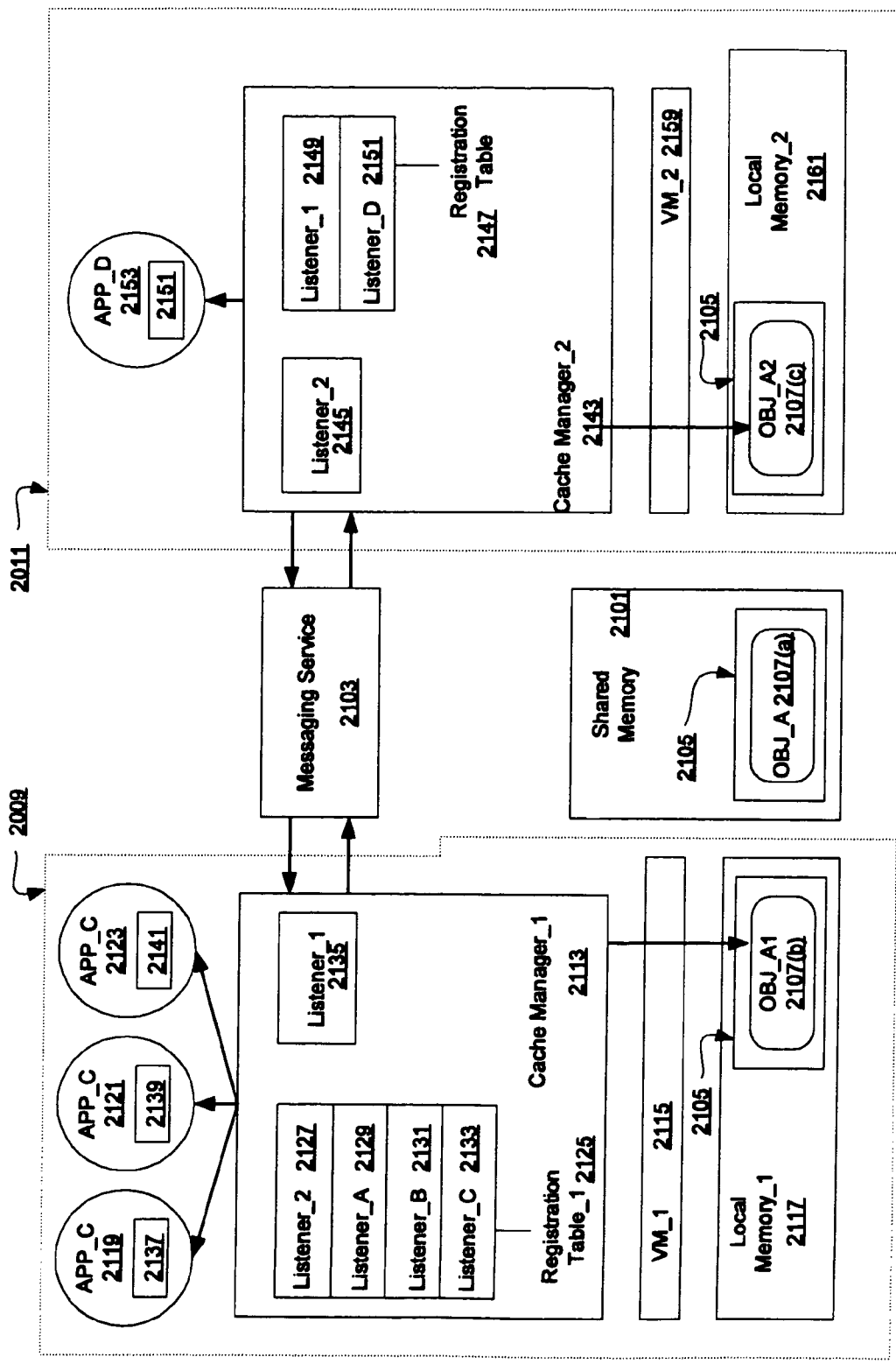
FIG. 21 illustrates a system architecture in accordance with an embodiment of the invention.

FIG. 21 illustrates a system architecture in accordance with an embodiment of the invention. This architecture is an instance that includes a messaging service 2103, a shared memory 2101, and a plurality of worker nodes 2109, 2111. An instance is defined as all of the worker nodes of a physical system together.

The messaging service 2103 allows each worker node to communicate with one another via a message passing protocol (to be discussed later). For example, messages from one server may be broadcast to all other worker nodes via the messaging service 2103. Alternatively, messages may be addressed directly to specific worker nodes (e.g., rather than being broadcast to all servers).

In one embodiment, the messaging service 2103 is implemented on dedicated server or machine other than the server or machine that is implementing the worker nodes. However, the messaging service 2103 may be implemented on the same server while still complying with the underlying principles of the invention.

The shared memory 2101 may contains several regions including cache 2105. Shared memory may be a part of local memory or a deeper storage such as a database. This shared memory 2101 and its contents, including cache 2105, are accessible by both worker nodes 2109, 2111. For example, the cache 2105 includes an object 2107*a* (e.g., OBJ_A) that both worker nodes access. A worker node generically includes at least an application, a cache manager, a virtual machine, and local memory. Of course it should be understood that multiple applications, virtual machines, etc. may be utilized while still complying with the underlying principles of the invention.

Each cache manager (or cache management service) 2113, 2143 includes a registration table 2125, 2147 and a listener node 2135, 2145. Listener nodes of other worker nodes' cache managers may be registered in the in the registration table of a particular worker node. The registration table may be created at deployment but is updateable during operation. These listener nodes are also referred to as "internal" listener nodes in this description.

An internal listener node receives notifications that a shared object has been or may be modified or removed from cache. These objects may include local copies 2107(*b*), 2107(*c*) stored in a cache region 2105 of local memory 2117, 2161 of objects 2107(*a*) in shared cache 2105 that may be operated on by a worker node's applications. One example of a region of local memory is a cache region.

As illustrated, the virtual machine 2115, 2159 of a worker node 2109, 2111 may support several applications 2119, 2121, 2123 (e.g., APP_A, APP_B, and APP_C) or a single application 2153 (e.g., APP_D). Each application 2119, 2121, 2123, 2153 may contain a single or multiple threads as discussed earlier. Each application 2119, 2121, 2123, 2153 also includes an application listener node 2137, 2139, 2141, 2157 that communicates with its respective cache manager. The application listener nodes are also known as "external" listener nodes.

Each external listener node 2137, 2139, 2141, 2157 is registered in its respective cache manager's registration table 2125, 2147. Effectively this registration provides for an address of the applications and/or listener nodes that are accessible to a particular cache manager. There may be separate registration tables for external and internal listeners.

Registration Table_1 2125 of worker node 2109 has an entry 2127 for Listener_2 2145 of worker node 2111 and entries 2129, 2131, 2133 for the applications 2119, 2121, 2123 of the worker node 2109. This means that Cache Manger_1 2113 may send messages to its applications 2119, 2121, 2123 and to Cache Manager_2 2143. Likewise, Registration Table_2 2153 of worker node 2111 an entry 2149 for Listener_2 2135 of worker node 2109 and an entry 2151 for the application 2153 of worker node 2111.

In one embodiment, the messaging service 2103 contains a registration table of all listeners of the system and routes messages accordingly. Each listener and/or its respective cache manager communicates directly with the messaging service without knowledge of the other worker nodes that share the object.

Exemplary Invalidation of a Shared Object

Figure 22:
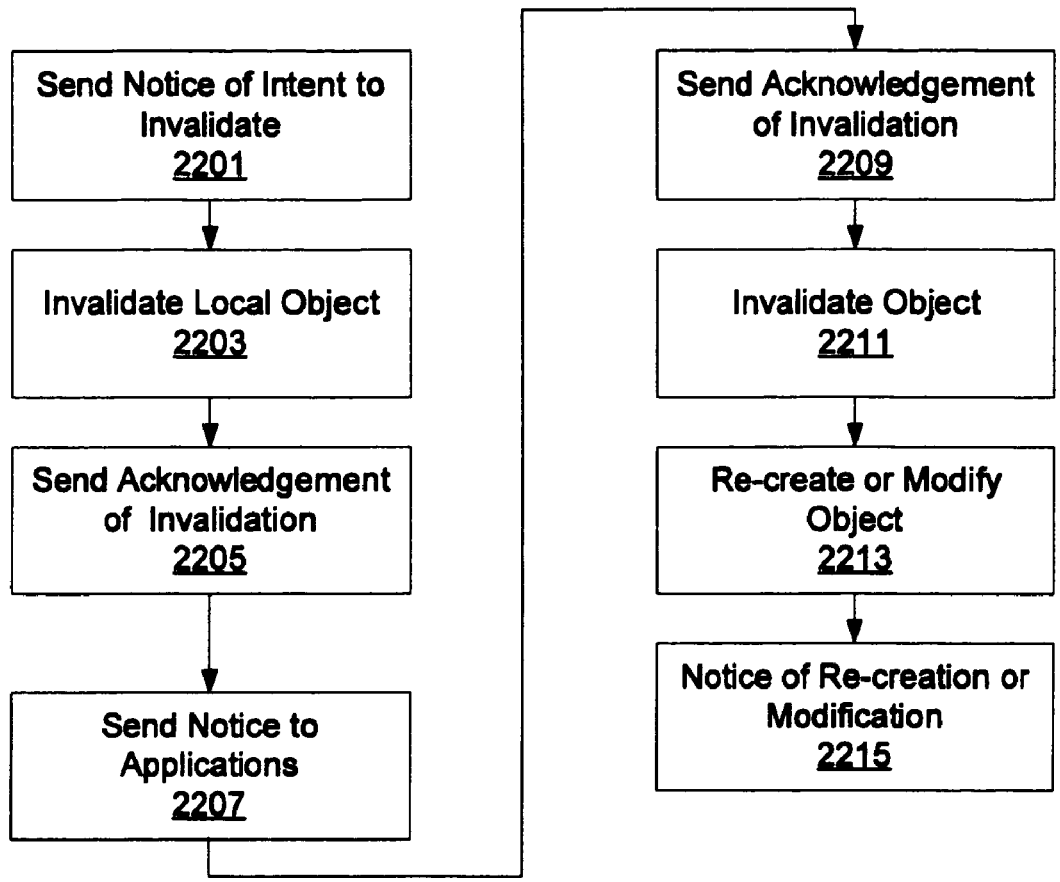
FIG. 22 illustrates a flow diagram of the removal or modification of a shared object including local copies of that object according to one embodiment of the invention.

FIG. 22 depicts a flow diagram of the removal or modification of a shared object including local copies of that object according to one embodiment of the invention. The following description will focus on the removal of OBJ_A2 2107*c* from FIG. 21. This object is a local copy of OBJ_A 2107(*a*) in the shared memory cache 2105. However, the same principles are applicable to the removal or modification of shared objects from any other local or shared memory including, but not limited to, when worker nodes are on different physical machines and when there are more than two worker nodes present.

When an application of a first worker node desires to remove an object that is shared between two worker nodes, notice is sent to the second worker node of the intent to invalidate at 2201. As discussed earlier, a listener node receives a notification that a shared object has been or may be modified or removed from cache. Notification helps to ensure that each application that may access that object (or its copy)

will be operating on the same object values. If one thread changes the object values the rest should be alerted to make sure that they have those new values.

The listener of the second worker node that needs to be notified of may be found using the first worker node's registration table. The message of notice of intent to invalidate is passed through the messaging service to the listener of the second worker node. For example, Listener_1 2135 is registered with Cache Manager_2 2143 and should therefore be notified when Cache Manager_2 2143 is going to make a change with respect to Cache Manager_2's 2143 local copy of the shared object 2107c. The address for Listener_1 2149 may be found in Registration Table_2 2147 and Cache Manager_2 2143 will send the notice of intent to invalidate through the messaging service 2103 to the listener 2135 of Cache Manager_1 2113.

When the notice of intent to invalidate has been received by the second worker node, the second worker node invalidates it local copy of the object at 2203. Specifically, the cache manager of the second worker node will invalidate the local copy of the object. At this time, the copy in shared memory may also be invalidated. For example, Listener_1 2135 will receive the notice to invalidate from Cache Manager_2 2143 and Cache Manager_1 2113 will invalidate its local copy of the object 2107b.

With the local copy of the second worker node invalidated or concurrently with the invalidation, the second worker node sends an acknowledgement of its invalidation to the first worker node at 2205. The first worker node, upon receipt of the acknowledgement, will know that its notice was received and that it is safe to invalidate its copy. In an alternative embodiment, the acknowledgement is sent before the invalidation is performed.

Sending a message and waiting for an acknowledgment is called synchronous messaging. In synchronous messaging the worker node that sent the message loses control of the object (e.g., cannot perform operations on the object) until an acknowledgment comes back to it. While this form of messaging requires more overhead and causes a delay, it helps to ensure that the object data is uniform. For example, if the sending worker node does not "hear" from all of the other worker nodes that they have invalidated their respective copy, the sender node may make a change that at least one worker has not made resulting in different copies of the object.

Conversely, in asynchronous messaging control is returned immediately after the message is sent without waiting for an acknowledgement. In one embodiment, asynchronous messaging is used and the first worker node does not wait for acknowledgement and invalidates its local copy after it sends its notice of invalidation. Internal notice may be synchronous or asynchronous.

In one embodiment, if the first worker node does not receive an acknowledgment it will resend its intent to invalidate message to the worker node(s) that has not responded at 2206 and again wait for an acknowledgment to come back. For example, the first worker node will wait for a set period of time before sending out this extra message. Furthermore, in one embodiment, if the first worker node does receive an acknowledgment after a set number of retries it will assume that the worker node not responding has died (e.g., its virtual machine has crashed) and continue as if an acknowledgement was received. The cache manager of the first worker node may remove the entry to the failed worker node's listener from the registration table so that the "dead" worker node is not notified if a later change is made and thereby causing another delay. In another embodiment, the sending of acknowledgment of invalidation at 2205 is unconditional and block 2206 does not exist.

A problem may arise where invalidation notices regarding the same object are sent at the same time. In other words, the first and second worker nodes both want to make a change to the same object at the same time. Essentially both worker nodes are now deadlocked and each waiting an acknowledgement from the other that will never occur. As described above each worker node has a set period of time to wait for acknowledgements to come back. After that time period has passed, one of the senders will fail, thus breaking the deadlock. The sender that failed will then get the acknowledgement from the successful sender.

The notice of intent to invalidation and/or acknowledgement scenario described above is called the internal phase of invalidation as all of the listener nodes notified are internal to the cache managers.

The listener of each application that may access the object to be invalidated is also sent notice of the invalidation at 2207. The registration table of each cache manager has entries for those application listeners that need to be notified. For example, Registration Table_1 2125 has entries 2129, 2131, 2133 for Listener_A 2137, Listener_B 2139, Listener_C 2141. In this example, App_A 2119, App_B 2121, and App_C 2123 may access the copy of the local object.

Application listener notice at 2207 typically occurs after the internal phase has completed or concurrent with the internal phase and is initiated by the sender of the internal notice. This external messaging may be either synchronous or asynchronous. Using synchronous messaging, each application listener node sends through the cache manager an acknowledgement message to the first worker node at 2209. Upon receiving an acknowledgement from each application listener, the first worker node invalidates its local copy of the object 2211. For example, the listener nodes for App_A 2137, App_B 2139, and App_C 2141 send an acknowledgement to worker node 2111 through Cache Manager_1 2113 and the messaging service 2103. Upon receiving those acknowledgments the local copy 2107(c) is invalidated.

Using asynchronous messaging, the each application listener node does not send an acknowledgement message and the first worker node invalidates its copy 2211 after the completion of the internal phase.

With the local copies of the object invalidated (or assumed to be) the object may need to be re-created or modified at 2213. Re-creation or modification uses a similar locking construct to that described earlier. This allows for only one worker node or virtual machine of a worker node to re-create or modify the object and thus keeping the object consistent. The earliest worker node to need access to the object will lock the other worker nodes out and re-create or modify the object. This locking of the object has the added benefit in that if the virtual machine working on the object crashes, the lock will be released and another worker node will re-create or modify the object.

For example, in one embodiment of re-create by a worker node the following code is used:

```
locker.execute("key", new runnable( )){
    run( ){
        if(cache.get("key") = = NULL){
            object new = recreateObject( );
            .
            .
            .
            cache.put("key", new);
        };
    };
}
```

With this code, the virtual machine of the worker node re-creating first sees if the object exists using the object's key. If the object does not exist a null value should be returned. This means that the object needs to be re-created and that the object has been successfully removed. The object is then recreated. Finally, the object is put back into memory using the same key as before. Each application has this snippet of code and only one worker node may execute it at a time. Of course it should be understood that equivalent code snippets may be used with the underlying principles.

In one embodiment, after the object has been re-created or modified, notice of this is sent to all of the worker nodes registered and the basic principles described above apply (i.e, the worker node ensures that everyone knows of the change) as described earlier in the Distributed Cache Architecture section. In one embodiment, this notice of re-creation or modification further includes a copy of the object.

Additionally, if the object to be invalidated is a shared closure in shared memory, the worker node that desires to remove or modify object may use the shared locking mechanism as described earlier. This may eliminate the need for using the messaging service unless the system still requires notification of the change to be made.

The above description described a scenario where only two worker nodes were present and the object to be removed was in one worker node's local memory. However, the same principals are applicable when more than two worker nodes are used. For example, the notice of intent to invalidate 2201 would be sent to all cache manager listeners that were found in the respective registration table. Additionally, the principals are applicable across machines (e.g., in a clustered environment).

Message Protocol

As mentioned earlier, the message server of FIG. 21 may require a particular message protocol to be utilized to transfer messages properly. This use of a common protocol ensures that each message contains the same type of information in a particular order, etc. and eases the processing burden for the messaging service.

In one embodiment, the message protocol includes components for object key, region identification (ID), type of message, transportable object, and queue of messages. However, it should be understood that each message may not need to use all of the components.

The object key is the same key that has been described before. For details regarding object keys please see the discussion regarding FIGS. 10-12. The region ID may be used to indicate which region of memory the message concerns. For example, the region ID is "local cache" which indicates that the cache of local memory is being addressed.

In one embodiment, the message is one of three types: internal, remove, or modify. An internal message is a message sent only to "internal" listeners as described above. For example, a notice of intent to invalidate or an acknowledgement of invalidation are internal messages. A remove type message is sent to the invalidation listeners as a part of alerting listeners that an object that had been previously removed has now been recreated. A modified type message is sent to the invalidation listeners to alert listeners that an object has now been modified.

In one embodiment, a serialized version of the object is desired for transmittal. This object is called a transportable object. For example, a storage plug-in may provide this serialized object. The use of serialization will generally make the overall message smaller in size as the entire object is not sent but instead only information need to reconstruct the object is sent. A cache manager that receives a serialized object may reconstruct the object from the serialized object and store it in memory. In alternative embodiments, an object is not serialized but is simply transmitted in its current state.

If the object removed/recreated or modified is in a shared closure, shared memory environment a message may still be sent but may not require that a "copy" of the object be sent as a part of the message. If a message is not sent, each worker node must access the shared closure to get a copy of the object.

In yet another embodiment, an object may be serialized into a database or shared storage as discussed earlier in the Distributed Cache Architecture section. In this case, the message does not contain a transportable object. Each listener receiving the object will instead have its cache manager get the object from the database or shared storage.

At any given time, there may be a need to send several messages through a message server. For example, when a worker node desires to remove a local copy of a shared object it must send notice to each "internal" listener registered with that worker node. This could require several messages without optimization. In one embodiment, several messages may be tied together in a single queue of messages thus reducing the count of messages sent. This allows for one or more larger message to be transmitted instead of several smaller messages. In one embodiment, this larger message is null, or in other words, simply one complete message or this larger message is a linked list of messages. Of course it should be understood that which optimization is chosen may depend on the type of message, size of the transportable object, available bandwidth, etc. From a performance standpoint it is generally better, although not always, to have a larger message as that may eliminate to send several messages tying up the message server. From a consistency standpoint it is generally better to have several smaller messages.

Another possible optimization, available in one embodiment, is the use of wildcards. A wildcard allows for a single message to be sent to the message server that may address a group of related items. For example, A*, where * is the wildcard would address all items that begin with A including A1, A2, and Ab. In one embodiment, upon receiving a message with a wildcard the message server will create several smaller messages to distribute appropriately. For example, if a particular worker node only requires learning about A1 then only the information about A1 is sent to that worker node from the message server. In another embodiment, the message server simply routes the message as sent to it by a worker node without further processing on the message. In this embodiment, each worker node receiving the message processes the message according to what it needs to know and discards the rest. For example, if a worker node only needs to know about A1 and Ab it discards the information about A2. In one embodiment, wildcards are only used with remove type messages.

Yet another possible optimization, available in one embodiment, is the use of patterns or properties that may be associated with objects. For example, an object may have the property of language type=English. A message may utilize that property to only address objects that have that particular language type.

An exemplary of message that may be sent using the protocol will now be described. This message uses the key "BUTTERS", has a region ID of local cache, is an internal type message, and is a null message. A cache manager that receives this message will hash the key "BUTTERS" to determine the address in local cache that the object associated with the key "BUTTERS" is stored. Since this is an internal message it may then invalidate the object. In this particular example, the message is null because only one message needed to be sent (not trying to address more than this one object).

Of course it should be understood that the protocol and embodiments described above may be utilized in systems that do not have a message server.

Central Cache Configuration

In enterprising applications, it is desirable to have both consistency and flexibility with respect to creating and configuring a cache. More specifically, each region of cache may need to be configured independent of the others. For example, the JNDI service may not need to utilize as many resources or even different resources as an application that is running.

Typically each service and application requires different amounts of cache storage. For example, an application may need to access and store only one (1) object in cache thereby needing less space than an application needing to access and store four (4) objects in cache. Therefore, the cache space allotted to each application or service is usually different.

Figure 23:
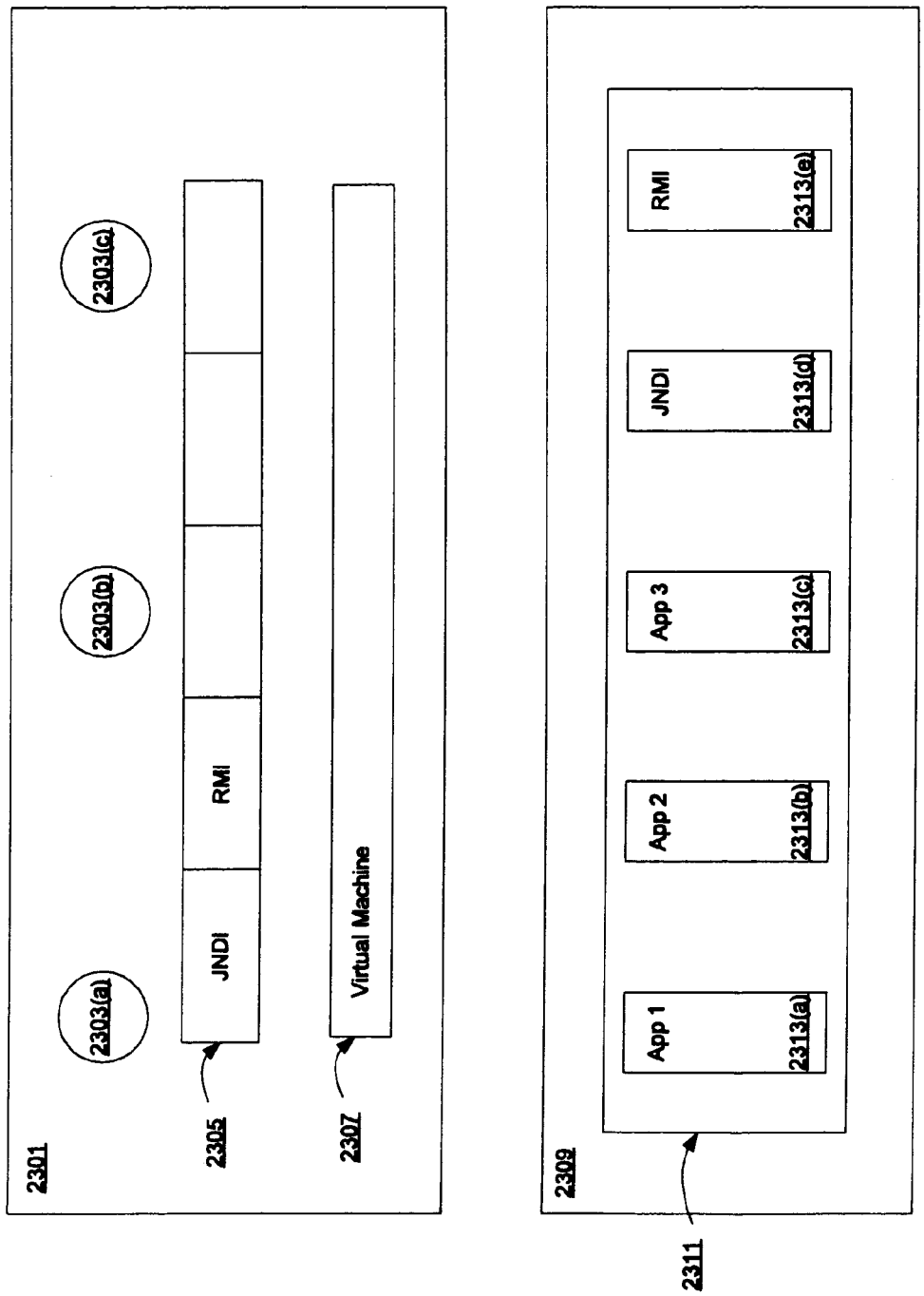
FIG. 23 illustrates an exemplary worker node and associated local memory in accordance with one embodiment of the invention.

FIG. 23 illustrates an exemplary worker node and associated local memory in accordance with one embodiment of the invention. The virtual machine 2301 executes applications 2303(a)-(c) that all share the same local memory 2309. Services 2305 of the worker node are those typically found in the J2EE environment (e.g., JNDI, RMI, etc.) and also share the local memory 2309. This local memory 2309 has a finite space that includes a cache 2311. Each service and application running in the worker node 2301 uses a region of that space 2313(a)-(e).

With respect to the worker node 2301 and memory 2309 of FIG. 23, using central configuration, a change may be made that globally affects the entire cache 2311 or a region of cache 2313(a)-(e) accessed by the worker node 2301. Central configuration is also viable in instance wide and cluster-wide implementations. Through the central cache configuration (CCC) offline configurability, monitoring (governance), and administration of various caches may be performed. Additionally, in one embodiment dynamic runtime re-configuration is enabled which allows the overall cache structure (of a single worker node, instance, or even a cluster) to be altered at runtime taking into account that the number of applications and services running varies over time.

In one embodiment, a configuration structure is created and maintained for each application of the worker node and for the services supported. This configuration structure stores the parameters by which the service or application is defined. Typically, a configuration structure is built using property sheets for each region that is configured.

The following is an exemplary document type definition ("DTD") that describes how to create a configuration structure for the J2EE services/regions (e.g., JNDI, RMI, etc.) and is the generic template for each application/service. It should be noted, however, that many of the specific formats employed within the DTD are not required for complying with the underlying principles of the invention.

```
cache-configuration.dtd
<!ELEMENT cache-configuration (global-configuration, regions)>
<!ELEMENT global-configuration EMPTY>
<!ATTLIST global-configuration
    TOTAL_SIZE CDATA #REQUIRED
>
<!--
Global size of the cache. For example, the number of megabytes
of memory available to use as cache.
-->
<!ELEMENT regions (region-configuration*)>
<!--
Each region of cache is definable. In other words, each service
and application may get its own region of cache.
-->
<!ELEMENT region-configuration (count-thresholds, size-thresholds,
scopes, plug-ins, principal, direct-invalidation, logging-mode,
synchronous, weight)>
<!--
Parameters that dictate the configuration of each region.
Count-thresholds - this is an input for the eviction plug-in
(as discussed earlier).
Size-thresholds - this is an input for the eviction plug-in
(as discussed earlier).
Scopes - may either be local (single worker node), instance
(shared memory), or cluster-wide (across machines).
Plug-ins - eviction and storage plug-ins (as discussed earlier).
Principal - class name of a region.
Direct-invalidation - Boolean flag. If set as true, then the
shared object that is to be invalidated is notified of its own
invalidation (see earlier discussion of modifying a shared object).
Logging mode - Boolean flag. If set true, transactions are logged.
Synchronous - Boolean flag. If set true, then the second wave of
messages is sent synchronously (see earlier discussion of modifying
a shared object).
Weight - relative weight given to a region (to be discussed in
detail later).
-->
<!ATTLIST region-configuration
    name CDATA #REQUIRED
    enabled CDATA #REQUIRED
>
<!-- Name of the region defined and if it is enabled.
-->
<!ELEMENT count-thresholds EMPTY>
<!ATTLIST count-thresholds
    start CDATA #REQUIRED
    upper CDATA #REQUIRED
    critical CDATA #REQUIRED
>
<!-- Three numbers used by the eviction policy plug-in - a start
value, upper value, and critical value.
-->
<!ELEMENT size-thresholds EMPTY>
<!ATTLIST size-thresholds
    start CDATA #REQUIRED
    upper CDATA #REQUIRED
    critical CDATA #REQUIRED
>
<!-- Three numbers used by the eviction policy plug-in - a start
value, upper value, and critical value.
-->
<!ELEMENT scope EMPTY>
<!ATTLIST scopes
    region CDATA #REQUIRED
>
<!-- Three numbers used by the eviction policy plug-in - a start
value, upper value, and critical value.
-->
<!ELEMENT PLUGINS (storage-configuration, eviction-configuration)>
<!ATTLIST plug-ins
    storage CDATA #REQUIRED
    eviction CDATA #REQUIRED
>
<!ELEMENT storage-configuration (property*)
<!ELEMENT eviction-configuration (property*)>
<!-- Type of storage or eviction policy respectively.
-->
<!ELEMENT principal (#PCDATA)>
<!ELEMENT direct-invalidation (#PCDATA)>
<!ELEMENT logging-mode (#PCDATA)>
<!ELEMENT synchronous (#PCDATA)>
<!ELEMENT weight (#PCDATA)>
<!ELEMENT property EMPTY>
<!—See above discussion regarding these elements. This is the
definition of those elements.
-->
<!ATTLIST property
    key CDATA #REQURIED
    value CDATA #REQURIED
>
```

An eXtensible Markup Language (XML) document may be created from the DTD as is known in the art. Both file types are easily understood and maintainable by a user. The DTD defines the building blocks of an XML document and the document structure with a list of elements. A DTD is declarable inline in a XML document or as an external reference.

An exemplary XML document created from the above DTD for the JNDI service is illustrated in FIG. 24. At 2401, the total size allocated to cache for all services and applications is defined. In this particular example, that size is set at one-third of the maximum memory size (e.g., if this depicts a worker node scope similar to FIG. 23 then this equals one-third of the local memory 2309 for cache 2311). Several regions 2403 may be allocated in the XML. For this particular example, the JNDI service is depicted at 2405. This service is not enabled (turned on) as indicated by enabled="false" at 2405. Settings for the eviction plug-in for the JNDI service are found in lines 2407 and 2409. The count-thresholds of 2407 are used to determine the number to be used in the timing of eviction of a key from the sorting queue as was discussed earlier with reference to FIGS. 6, 13, and 14. The size-thresholds of 2409 define threshold values of memory consumption of the cache region that trigger eviction as was discussed earlier with reference to FIG. 15.

The scopes region 2411 determines which type of system is being configured. Exemplary regions are local (e.g., single worker node), instance (e.g., more than one worker node of a physical machine that shares memory), and cluster-wide (e.g., across physical machines).

Line 2415 begins the definition of the storage plug-in used in the region. The value "DBStorage" and "BackendStoragePlugin" indicate a write-through process in which an object is persisted into deeper storage (e.g., a database) in addition to the normal "CombinatorsStorage" (e.g., local memory). The eviction plug-in configuration 2417 shown is the "recently-UsedPeriod" or the LRU 617 as described earlier. The period is set at 5000 ms. Other eviction plug-in configurations (e.g., LFU and FIFO) have already been described.

The principal of line 2419 is used with respect to the isolation of the cache region. It serves as an identifier mapping between the cache region and cache user. Typically, the principal is unique. The principal is a class name that is used to identify the user that has the right to use a particular cache region. The class name is chosen so that it exists in the stack of traces of the calls in the application or service that invokes the "getCacheRegion" in the cache region factory. The stack trace is inspected for the principal, if the principal is missing (null) then the application or service trying to access this region of cache is not authorized and will not be granted access.

Direct-invalidation is decided at 2421. As discussed before this is a Boolean flag value. If set as true, then the shared object that is to be invalidated is notified of its own invalidation (see earlier discussion of modifying a shared object). The logging setting (Boolean flag) is set at 2423. If set true, transactions are logged. In this illustration the second wave of messages for object invalidation is synchronous as indicated by the "TRUE" Boolean flag of 2425.

Of course more than one region may be defined. At line 2429 the RMI service definition begins.

Line 2427 gives the relative normalized weight of the cache region JNDI. Weight is a number that represents the relative amount of memory that will determine the size-thresholds for the region. This amount of memory is calculated using the total cache memory for all caches and all cache region weight property. Generically, each region is defined relative to the others and each region does not know how much space the other regions use. It is important to note that relative weight is not the equivalent of using percentages.

For example, consider the local flavor embodiment of FIG. 23, where only local memory is utilized. The following equation (1) determines how much space a particular region receives in the cache:

$$\text{Cache Space Allotted To A Region } i = (\text{Total Size}) * \left( \frac{RWi}{\sum_{j=1}^{R} RWj} \right) \quad (1)$$

"R" is the total number of cache regions (number of applications and services running). "Total size" is the total cache space. "RW" is the relative normalized weight of the service or application. The sum of all cache region weights will be 100 (meaning 100% of "total size").

For example, consider a scenario where the total size is 60 MB, the weight is 100, and the threshold values for two services and an application are 102,400; 768,000; and 102,400 respectively. The space allotted to the application with a RW of 102,400 is 6.3 MB as calculated below.

$$6.3 = (60) * \left( \frac{102,400}{102,400 + 102,400 + 768,000} \right) \quad (2)$$

Equation (1) is applicable in a shared read only embodiment, with only shared memory, as all of the services and applications use the same total size of memory and can be weighted against each other. In a shared flavor embodiment, with local and shared memory, each local flavor determines its local regions.

In another embodiment, weight is not used and instead each region declares a set amount cache to occupy. The total amount from all of the regions cannot exceed the size of the memory.

Figure 25:
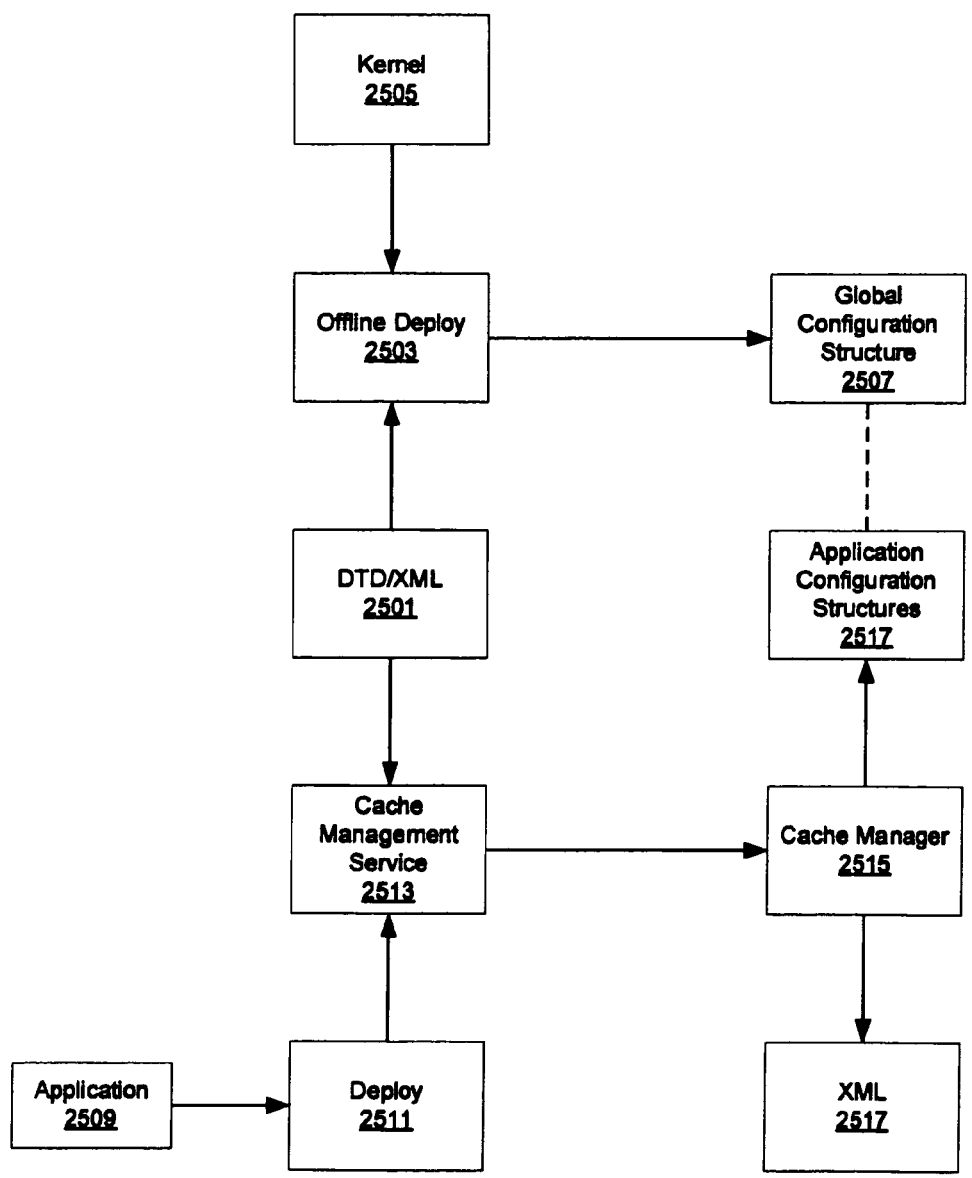
FIG. 25 illustrates an embodiment of a system initializing a central cache configuration (CCC) based system.

FIG. 25 illustrates an embodiment of a system initializing a central cache configuration (CCC) based system. The DTD/XML 2501 format provides the framework for the configuration structures to be utilized by the system as discussed earlier. Due to the different nature of J2EE engine service and J2EE applications, two utilities are used for cache region configuration. The first utility, J2EE engine service, is incorporated into the offline deploy tool 2503. The offline deploy tool 2503 transforms information from the kernel 2505 into property sheets for each region. These property sheets create a global configuration structure 2507 for the J2EE engine services. Exemplary property sheets include those for the global properties (e.g., memory size), region configuration properties (e.g., service properties), and inheritable properties.

The second utility is a deploy container for the deploy service 2511 in the J2EE engine. It is registered in the deploy service 2511 and listens for a cache configuration file that will be included in an application archive 2509. The application archive contains information regarding each application that may be run on the system. In an alternative embodiment, each application interfaces with the deploy service 2511 individually. The deploy service passes the XML to the cache management service 2513. The cache management service serves as a proxy to the Cache Manager 2515. Only the trusted code of the cache management service is allowed to invoke these methods of the Cache Manager 2515. The Cache Manager 2515 uses the same implementation as the offline deploy tool 2503 to transform the information from the applications into property sheets 2517 for the applications. The configuration structures 2507, 2517 may be stored in a persistent database (not shown).

If a property (plug-in configuration, thresholds, weight, etc.) is not specified in the property sheets 2517 of the applications, they may inherit properties from the global configuration structure 2507 through the use of a parent concept. A parent is the name of an inheritable region configuration. For example, an application with the parent JNDI will use the values from the JNDI region as defined in the global configuration structure 2507 to fill the missing parts of its property sheet.

In one embodiment, the Cache Manager 2515 is also capable of exporting an XML file out of created property sheets 2517. This is really helpful in the development phase of services, because it provides an easy way to configure (using GUI and property sheets) and have a deployable XML that is readable and structured.

Figure 26:
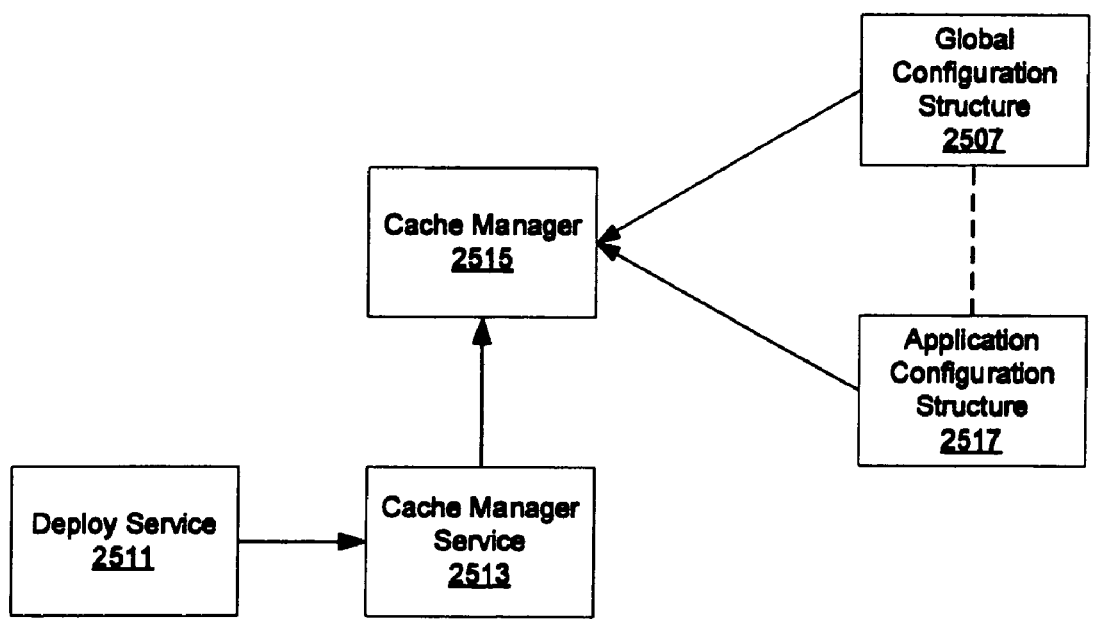
FIG. 26 illustrates an embodiment of a portion of a system running a central cache configuration (CCC) based system.

FIG. 26 illustrates an embodiment of a portion of a system running a central cache configuration (CCC) based system. The Cache Manager 2515 reads the global configuration structure 2507 to gather information about the services running on the system. For example, if the property sheet for a service is enabled (e.g., Boolean true at line 2405) the service is running. When the deploy service 2511 begins to start an application it notifies the cache management service 2513 about the start of a specific application and passes that application's specific region configuration information. The Cache Manager 2515 then reads the property sheets associated with the application (e.g., application configuration structures 2517) and initializes particular cache regions for the services running and the application that was started.

The Cache Manager 2515 dynamically reconfigures the cache regions upon the start or stop of an application or service. The threshold values change upon starting or stopping of an application or service and therefore change the allotment of space in the cache region using the earlier describing relative normal weighting scheme.

Figure 27:
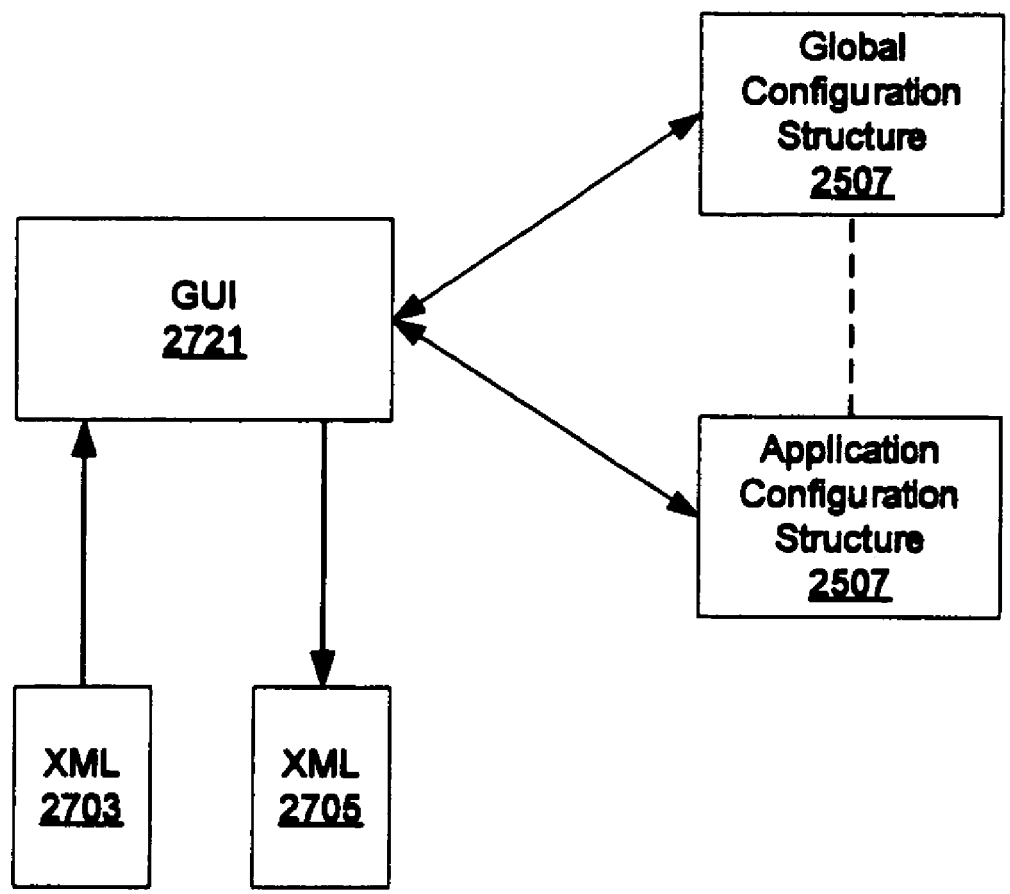
FIG. 27 illustrates an embodiment of a graphical user interface (GUI) interacting with a central cache configuration based system.

FIG. 27 illustrates an embodiment of a graphical user interface (GUI) interacting with a central cache configuration based system. Through the GUI 2721 both service and application configuration structures are accessible. Inheritance characteristics may also be available through the GUI 2721 so that a user sees what is inherited and what has been created.

The GUI 2721 uses the offline configuration manager to get the needed sub-configurations and reads/writes through it to them. Import 2703 and export 2705 functionality is provided which uses the same utility classes as offline deploy and cache manager to parse XML's. The DTD is the same that is used during deploy.

Through importing and exporting the GUI 1021 may extend the property sheets of the configuration structures 2507, 2517 with new properties and build up an XML from them.

In one embodiment, the GUI 2721 interfaces with the cache manager 2515 instead of the configuration structures.

Isolation

Typically, systems with good performance and reliability rely on a combination of coherence and isolation. Coherence provides consistency. For example, the earlier discussion and embodiments of messaging help to provide consistency to shared objects of a system.

Isolation provides exclusivity of operation. There are two types of isolation: 1) isolation between different applications and 2) isolation between different threads or virtual machines of the same application.

Isolation between different applications is intrinsic if each application receives different memory regions (including cache) with different names. With this approach no collisions can occur between applications because the applications simply do not require all of the same resources.

Isolation between threads or virtual machines of the same application may be provided by using the previously described locker construct and/or synchronization. If both the application and cache manager support the locker construct it should ensure that each operation is executed exclusively of all others. Effectively operations are serialized. One way to do that is through atomic operations where either every step within a transaction completes or none of them do.

Closing Comments

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 28:
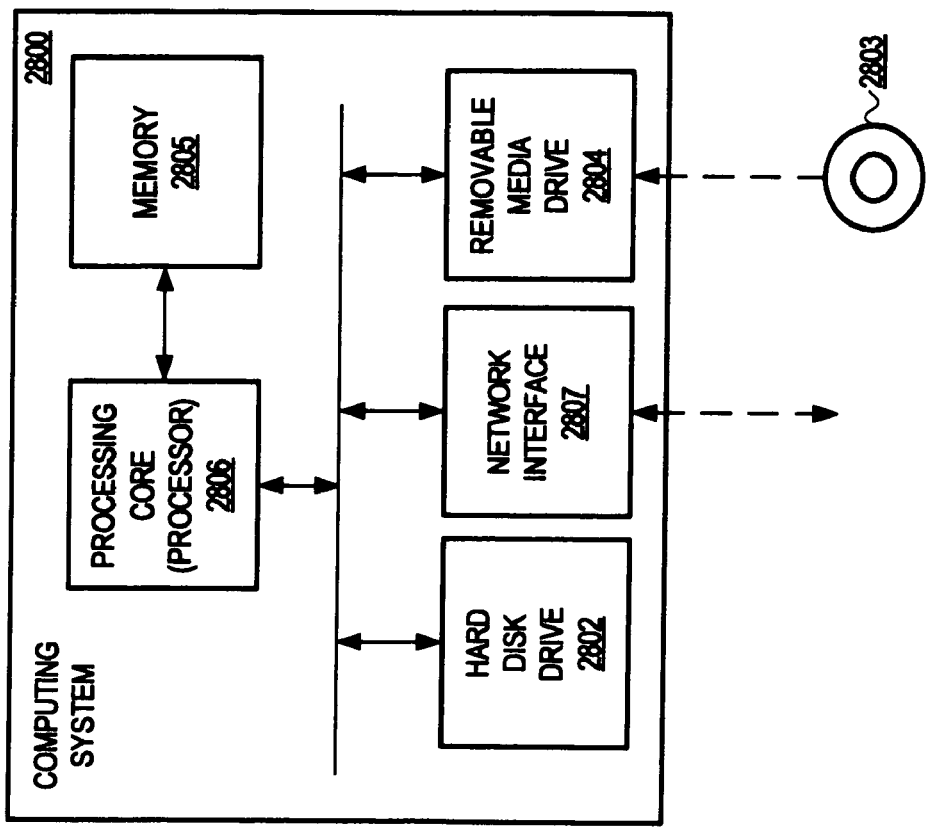
FIG. 28 illustrates an embodiment of a computing system.

FIG. 28 is a block diagram of a computing system 2800 that can execute program code stored by an article of manufacture. It is important to recognize that the computing system block diagram of FIG. 28 is just one of various computing system architectures. The applicable article of manufacture may include one or more fixed components (such as a hard disk drive 2802 or memory 2805) and/or various movable components such as a CD ROM 2803, a compact disc, a magnetic tape, etc operable with removable media drive 2804. In order to execute the program code, typically instructions of the program code are loaded into the Random Access Memory (RAM) 2805; and, the processing core 2806 then executes the instructions. The processing core 2806 may include one or more processors and a memory controller function.

A high-level language virtual machine (e.g., a Java Virtual Machine, a Parrot virtual machine, etc.) or interpreter (e.g., Common Language Runtime ("CLR")) runs as an application program on top of a computer operating system and converts source code from a high-level language (e.g., Java, C#, VB.NET, Python, C, C++, J#, APL, etc.) into an intermediate form (e.g., Java byte code, Microsoft Intermediate Language, etc.). This intermediate form is then converted to machine level code by compiling the intermediate code at run-time (e.g. JIT compiler), interpreting the intermediate code, or a combination of both. The end result is machine level code that is understandable to a specific processor(s) of a processing core of a computer(s). The use of a virtual machine or an interpreter allows a developer to write computer programs that run independently of platforms, languages, and hardware. For example, any program developed under the J2EE standard can run on any computer where a corresponding Java Virtual Machine is installed and any .NET program may run on any computer with .NET installed.

There are many different implementations of the Java Virtual Machine (e.g., those offered by Sun, Oracle, BEA, IBM, SAP, and etc.) and interpreters (e.g., those offered through NET, Mono, dotGNU, etc.), however these different implementations work in the same general fashion as discussed above. It is believed that processes taught by the discussion above can be practiced within these various software environments.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above focus on the Java environment, the underlying principles of the invention may be employed in virtually any environment in which objects are managed. These environments include, but are not limited to J2EE, the Microsoft NET framework, and the Advanced Business Application Programming ("ABAP") standard developed by SAP AG.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system of providing cache isolation, comprising:
a template file;
an offline deploy tool to transform information regarding a JAVA 2 Platform, Enterprise Edition (J2EE) service into a first configuration structure to store parameters that define the J2EE service using the template file; and
a cache manager to transform information regarding a J2EE application into a second configuration structure to store parameters that define the J2EE application using the template file and to read the first and second configuration structures, wherein the cache manager dynamically allocates cache regions based on the configuration structures to isolate the J2EE application from the J2EE service and other J2EE applications; and
a lock construct, the cache manager to employ the lock construct to ensure that shared objects are not simultaneously accessed by two or more threads and/or virtual machines.

2. The system as in claim 1, wherein the template file further comprises definable parameters selected from the group consisting of: count thresholds, size thresholds, scope, storage plug-in, eviction plug-in, invalidation, logging, messaging type, and relative weight.

3. The system as in claim 2, wherein the template further includes a principal, the principal to identify a particular cache region and ensure cache isolation by having cache regions defined by principal.

4. The system as in claim 3, further comprising:
a kernel to provide the information about the J2EE service to the offline deploy tool.

5. The system as in claim 4, further comprising:
a deploy tool to gather information regarding the J2EE application from an application container and provide the information to the cache management.

6. The system as in claim 5, further comprising:
a graphical user interface to provide user access to the first and second configuration structures.

7. A computer-implemented method, comprising:
generating a first specific cache region configuration structure for a JAVA 2 Platform, Enterprise Edition (J2EE) service based on a principal name, wherein the configuration structure is based on a pre-defined template including the principal name and stores parameters that define the J2EE service;
generating a second specific cache region configuration structure for a J2EE application based on a principal name, wherein the configuration structure is based on the pre-defined template including the principal name and stores parameters that define the J2EE application;
initializing particular cache regions based on the configuration structures of the J2EE service and application to isolate the J2EE application from the J2EE service and other J2EE applications; and
maintaining cache region isolation through the use of a lock construct.

8. The method as in claim 7, wherein each configuration structure comprises a group of property sheets for each region of cache.

9. The method as in claim 8, wherein generating a configuration structure for a cache region further comprises:
transforming information from a kernel regarding the service into one property sheet in the group of property sheets.

10. The method as in claim 9, wherein generating a configuration structure for a cache region further comprises:
transforming information from an application archive regarding the cache region into one property sheet in the group of property sheets.

11. The method as in claim 10, wherein the pre-defined template is an Extensible Markup Language (XML) document.

12. The method as in claim 7, further comprising:
re-initializing cache regions dynamically upon a stopping of a J2EE service and/or application.

13. The method as in claim 7, further comprising:
re-initializing cache regions dynamically upon a starting of a J2EE service and/or application.

14. The method as in claim 7, wherein initializing particular cache regions based on the configuration structures of the J2EE services and applications further comprises:
apportioning a cache region based on a relative weight schema.

15. The method as in claim 14, wherein the relative weight schema comprises:
multiplying a total cache space available by a relative normalized weight of the service and/or application; and
dividing by the sum of all relative normalized weights used in the system.

16. An article of manufacture storing program code which, when executed by a machine, causes the machine to perform the operations of:
generating a first specific cache region configuration structure for a JAVA 2 Platform, Enterprise Edition (J2EE) service based on a principal name, wherein the configuration structure is based on a pre-defined template including the principal name and stores parameters that define the J2EE service;

generating a second specific cache region configuration structure for a J2EE application based on a principal name, wherein the configuration structure is based on the pre-defined template including the principal name and stores parameters that define the J2EE application;

initializing particular cache regions based on the configuration structures of the J2EE service and application to isolate the J2EE application from the J2EE service and other J2EE applications; and maintaining cache region isolation through the use of a lock construct.

17. The article of manufacture as in claim 16 comprising additional program code to cause said machine to perform the operations of:

re-initializing cache regions dynamically upon a stopping and/or starting of a J2EE service and/or application.

18. The article of manufacture as in claim 16 comprising additional program code to cause said machine to perform the operations of:

apportioning a cache region based on a relative weight schema.

* * * * *

UNITED STATES PATENT AND TRADEMARK OFFICE
CERTIFICATE OF CORRECTION

PATENT NO. : 7,581,066 B2 Page 1 of 1
APPLICATION NO. : 11/119084
DATED : August 25, 2009
INVENTOR(S) : Marwinski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this

Fourteenth Day of September, 2010

David J. Kappos
*Director of the United States Patent and Trademark Office*